(12) United States Patent
Al-Ali et al.

(10) Patent No.: US 12,478,293 B1
(45) Date of Patent: Nov. 25, 2025

(54) SYSTEMS AND METHODS FOR ASSESSMENT OF PLACEMENT OF A DETECTOR OF A PHYSIOLOGICAL MONITORING DEVICE

(71) Applicant: Masimo Corporation, Irvine, CA (US)

(72) Inventors: Ammar Al-Ali, San Juan Capistrano, CA (US); Sean Devlin, Irvine, CA (US)

(73) Assignee: Masimo Corporation, Irvine, CA (US)

( * ) Notice: Subject to any disclaimer, the term of this patent is extended or adjusted under 35 U.S.C. 154(b) by 839 days.

(21) Appl. No.: 17/450,783

(22) Filed: Oct. 13, 2021

Related U.S. Application Data

(60) Provisional application No. 63/253,755, filed on Oct. 8, 2021, provisional application No. 63/091,443, filed on Oct. 14, 2020, provisional application No. 63/091,469, filed on Oct. 14, 2020.

(51) Int. Cl.
*A61B 5/1455* (2006.01)
*A61B 5/00* (2006.01)
*A61B 5/024* (2006.01)

(52) U.S. Cl.
CPC .......... *A61B 5/14551* (2013.01); *A61B 5/024* (2013.01); *A61B 5/681* (2013.01); *A61B 2560/0223* (2013.01)

(58) Field of Classification Search
CPC ... A61B 5/0205; A61B 5/145; A61B 5/14532; A61B 5/14535; A61B 5/14542; A61B 5/14546; A61B 5/1455; A61B 5/14551; A61B 5/14552; A61B 5/1495; A61B 5/6801; A61B 5/681; A61B 5/6824; A61B 5/6825; A61B 5/6826
See application file for complete search history.

(56) References Cited

U.S. PATENT DOCUMENTS

| | | |
|---|---|---|
| 4,960,128 A | 10/1990 | Gordon et al. |
| 4,964,408 A | 10/1990 | Hink et al. |
| 5,218,962 A * | 6/1993 | Mannheimer ........ A61B 5/6885 356/41 |
| 5,319,355 A | 6/1994 | Russek |
| 5,337,744 A | 8/1994 | Branigan |
| 5,341,805 A | 8/1994 | Stavridi et al. |
| D353,195 S | 12/1994 | Savage et al. |
| D353,196 S | 12/1994 | Savage et al. |
| 5,377,676 A | 1/1995 | Vari et al. |
| D359,546 S | 6/1995 | Savage et al. |
| 5,431,170 A | 7/1995 | Mathews |

(Continued)

OTHER PUBLICATIONS

US 2024/0016391 A1, 01/2024, Lapotko et al. (withdrawn)

*Primary Examiner* — Chu Chuan Liu
(74) *Attorney, Agent, or Firm* — Knobbe, Martens, Olson & Bear, LLP

(57) ABSTRACT

A non-invasive physiological sensor system implemented as a smart watch or other wearable device includes an emitter for emitting light and a detector for collecting light after the light interacts with a tissue of a wearer. The system can measure light intensity at one or more radial distances to estimate attenuation parameter values that can be used to correct physiological parameter bias across subjects. In addition or alternatively, the system can determine whether a detector is positioned sufficiently proximate to an obstructing tissue (for example, an artery or vein) so as to cause inaccurate measurements by the detector.

16 Claims, 25 Drawing Sheets

(56) References Cited

U.S. PATENT DOCUMENTS

| | | |
|---|---|---|
| 5,436,499 A | 7/1995 | Namavar et al. |
| D361,840 S | 8/1995 | Savage et al. |
| D362,063 S | 9/1995 | Savage et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |
| 5,494,043 A | 2/1996 | O'Sullivan et al. |
| 5,533,511 A | 7/1996 | Kaspari et al. |
| 5,561,275 A | 10/1996 | Savage et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,040,578 A | 3/2000 | Malin et al. |
| 6,066,204 A | 5/2000 | Haven |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,595,316 B2 | 7/2003 | Cybulski et al. |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,738,652 B2 | 5/2004 | Mattu et al. |
| 6,760,607 B2 | 7/2004 | Al-Ali |
| 6,788,965 B2 | 9/2004 | Ruchti et al. |
| 6,816,241 B2 | 11/2004 | Grubisic |
| 6,822,564 B2 | 11/2004 | Al-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin, IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |

(56) References Cited

U.S. PATENT DOCUMENTS

| | | | |
|---|---|---|---|
| RE41,912 | E | 11/2010 | Parker |
| 7,880,626 | B2 | 2/2011 | Al-Ali et al. |
| 7,909,772 | B2 | 3/2011 | Popov et al. |
| 7,919,713 | B2 | 4/2011 | Al-Ali et al. |
| 7,937,128 | B2 | 5/2011 | Al-Ali |
| 7,937,129 | B2 | 5/2011 | Mason et al. |
| 7,941,199 | B2 | 5/2011 | Kiani |
| 7,957,780 | B2 | 6/2011 | Lamego et al. |
| 7,962,188 | B2 | 6/2011 | Kiani et al. |
| 7,976,472 | B2 | 7/2011 | Kiani |
| 7,990,382 | B2 | 8/2011 | Kiani |
| 8,008,088 | B2 | 8/2011 | Bellott et al. |
| RE42,753 | E | 9/2011 | Kiani-Azarbayjany et al. |
| 8,028,701 | B2 | 10/2011 | Al-Ali et al. |
| 8,048,040 | B2 | 11/2011 | Kiani |
| 8,050,728 | B2 | 11/2011 | Al-Ali et al. |
| RE43,169 | E | 2/2012 | Parker |
| 8,118,620 | B2 | 2/2012 | Al-Ali et al. |
| 8,130,105 | B2 | 3/2012 | Al-Ali et al. |
| 8,182,443 | B1 | 5/2012 | Kiani |
| 8,190,223 | B2 | 5/2012 | Al-Ali et al. |
| 8,203,438 | B2 | 6/2012 | Kiani et al. |
| 8,203,704 | B2 | 6/2012 | Merritt et al. |
| 8,219,172 | B2 | 7/2012 | Schurman et al. |
| 8,224,411 | B2 | 7/2012 | Al-Ali et al. |
| 8,229,532 | B2 | 7/2012 | Davis |
| 8,233,955 | B2 | 7/2012 | Al-Ali et al. |
| 8,255,026 | B1 | 8/2012 | Al-Ali |
| 8,265,723 | B1 | 9/2012 | McHale et al. |
| 8,274,360 | B2 | 9/2012 | Sampath et al. |
| 8,280,473 | B2 | 10/2012 | Al-Ali |
| 8,315,683 | B2 | 11/2012 | Al-Ali et al. |
| RE43,860 | E | 12/2012 | Parker |
| 8,346,330 | B2 | 1/2013 | Lamego |
| 8,353,842 | B2 | 1/2013 | Al-Ali et al. |
| 8,355,766 | B2 | 1/2013 | MacNeish, III et al. |
| 8,374,665 | B2 | 2/2013 | Lamego |
| 8,388,353 | B2 | 3/2013 | Kiani et al. |
| 8,401,602 | B2 | 3/2013 | Kiani |
| 8,414,499 | B2 | 4/2013 | Al-Ali et al. |
| 8,418,524 | B2 | 4/2013 | Al-Ali |
| 8,428,967 | B2 | 4/2013 | Olsen et al. |
| 8,430,817 | B1 | 4/2013 | Al-Ali et al. |
| 8,437,825 | B2 | 5/2013 | Dalvi et al. |
| 8,455,290 | B2 | 6/2013 | Siskavich |
| 8,457,707 | B2 | 6/2013 | Kiani |
| 8,471,713 | B2 | 6/2013 | Poeze et al. |
| 8,473,020 | B2 | 6/2013 | Kiani et al. |
| 8,509,867 | B2 | 8/2013 | Workman et al. |
| 8,515,509 | B2 | 8/2013 | Bruinsma et al. |
| 8,523,781 | B2 | 9/2013 | Al-Ali |
| D692,145 | S | 10/2013 | Al-Ali et al. |
| 8,571,617 | B2 | 10/2013 | Reichgott et al. |
| 8,571,618 | B1 | 10/2013 | Lamego et al. |
| 8,571,619 | B2 | 10/2013 | Al-Ali et al. |
| 8,577,431 | B2 | 11/2013 | Lamego et al. |
| 8,584,345 | B2 | 11/2013 | Al-Ali et al. |
| 8,588,880 | B2 | 11/2013 | Abdul-Hafiz et al. |
| 8,630,691 | B2 | 1/2014 | Lamego et al. |
| 8,641,631 | B2 | 2/2014 | Sierra et al. |
| 8,652,060 | B2 | 2/2014 | Al-Ali |
| 8,666,468 | B1 | 3/2014 | Al-Ali |
| 8,670,811 | B2 | 3/2014 | O'Reilly |
| RE44,823 | E | 4/2014 | Parker |
| RE44,875 | E | 4/2014 | Kiani et al. |
| 8,688,183 | B2 | 4/2014 | Bruinsma et al. |
| 8,690,799 | B2 | 4/2014 | Telfort et al. |
| 8,702,627 | B2 | 4/2014 | Telfort et al. |
| 8,712,494 | B1 | 4/2014 | MacNeish, III et al. |
| 8,715,206 | B2 | 5/2014 | Telfort et al. |
| 8,723,677 | B1 | 5/2014 | Kiani |
| 8,740,792 | B1 | 6/2014 | Kiani et al. |
| 8,755,535 | B2 | 6/2014 | Telfort et al. |
| 8,755,872 | B1 | 6/2014 | Marinow |
| 8,764,671 | B2 | 7/2014 | Kiani |
| 8,768,423 | B2 | 7/2014 | Shakespeare et al. |
| 8,771,204 | B2 | 7/2014 | Telfort et al. |
| 8,781,544 | B2 | 7/2014 | Al-Ali et al. |
| 8,790,268 | B2 | 7/2014 | Al-Ali |
| 8,801,613 | B2 | 8/2014 | Al-Ali et al. |
| 8,821,397 | B2 | 9/2014 | Al-Ali et al. |
| 8,821,415 | B2 | 9/2014 | Al-Ali et al. |
| 8,830,449 | B1 | 9/2014 | Lamego et al. |
| 8,840,549 | B2 | 9/2014 | Al-Ali et al. |
| 8,852,094 | B2 | 10/2014 | Al-Ali et al. |
| 8,852,994 | B2 | 10/2014 | Wojtczuk et al. |
| 8,897,847 | B2 | 11/2014 | Al-Ali |
| 8,911,377 | B2 | 12/2014 | Al-Ali |
| 8,989,831 | B2 | 3/2015 | Al-Ali et al. |
| 8,998,809 | B2 | 4/2015 | Kiani |
| 9,066,666 | B2 | 6/2015 | Kiani |
| 9,066,680 | B1 | 6/2015 | Al-Ali et al. |
| 9,095,316 | B2 | 8/2015 | Welch et al. |
| 9,106,038 | B2 | 8/2015 | Telfort et al. |
| 9,107,625 | B2 | 8/2015 | Telfort et al. |
| 9,131,881 | B2 | 9/2015 | Diab et al. |
| 9,138,180 | B1 | 9/2015 | Coverston et al. |
| 9,153,112 | B1 | 10/2015 | Kiani et al. |
| 9,192,329 | B2 | 11/2015 | Al-Ali |
| 9,192,351 | B1 | 11/2015 | Telfort et al. |
| 9,195,385 | B2 | 11/2015 | Al-Ali et al. |
| 9,211,095 | B1 | 12/2015 | Al-Ali |
| 9,218,454 | B2 | 12/2015 | Kiani et al. |
| 9,245,668 | B1 | 1/2016 | Vo et al. |
| 9,267,572 | B2 | 2/2016 | Barker et al. |
| 9,277,880 | B2 | 3/2016 | Poeze et al. |
| 9,307,928 | B1 | 4/2016 | Al-Ali et al. |
| 9,323,894 | B2 | 4/2016 | Kiani |
| D755,392 | S | 5/2016 | Hwang et al. |
| 9,326,712 | B1 | 5/2016 | Kiani |
| 9,392,945 | B2 | 7/2016 | Al-Ali et al. |
| 9,408,542 | B1 | 8/2016 | Kinast et al. |
| 9,436,645 | B2 | 9/2016 | Al-Ali et al. |
| 9,445,759 | B1 | 9/2016 | Lamego et al. |
| 9,474,474 | B2 | 10/2016 | Lamego et al. |
| 9,480,435 | B2 | 11/2016 | Olsen |
| 9,510,779 | B2 | 12/2016 | Poeze et al. |
| 9,517,024 | B2 | 12/2016 | Kiani et al. |
| 9,532,722 | B2 | 1/2017 | Lamego et al. |
| 9,560,996 | B2 | 2/2017 | Kiani |
| 9,579,039 | B2 | 2/2017 | Jansen et al. |
| 9,622,692 | B2 | 4/2017 | Lamego et al. |
| D788,312 | S | 5/2017 | Al-Ali et al. |
| 9,649,054 | B2 | 5/2017 | Lamego et al. |
| 9,697,928 | B2 | 7/2017 | Al-Ali et al. |
| 9,717,458 | B2 | 8/2017 | Lamego et al. |
| 9,724,016 | B1 | 8/2017 | Al-Ali et al. |
| 9,724,024 | B2 | 8/2017 | Al-Ali |
| 9,724,025 | B1 | 8/2017 | Kiani et al. |
| 9,749,232 | B2 | 8/2017 | Sampath et al. |
| 9,750,442 | B2 | 9/2017 | Olsen |
| 9,750,461 | B1 | 9/2017 | Telfort |
| 9,775,545 | B2 | 10/2017 | Al-Ali et al. |
| 9,778,079 | B1 | 10/2017 | Al-Ali et al. |
| 9,782,077 | B2 | 10/2017 | Lamego et al. |
| 9,787,568 | B2 | 10/2017 | Lamego et al. |
| 9,808,188 | B1 | 11/2017 | Perea et al. |
| 9,839,379 | B2 | 12/2017 | Al-Ali et al. |
| 9,839,381 | B1 | 12/2017 | Weber et al. |
| 9,847,749 | B2 | 12/2017 | Kiani et al. |
| 9,848,800 | B1 | 12/2017 | Lee et al. |
| 9,861,298 | B2 | 1/2018 | Eckerbom et al. |
| 9,861,305 | B1 | 1/2018 | Weber et al. |
| 9,877,650 | B2 | 1/2018 | Muhsin et al. |
| 9,891,079 | B2 | 2/2018 | Dalvi |
| 9,924,897 | B1 | 3/2018 | Abdul-Hafiz |
| 9,936,917 | B2 | 4/2018 | Poeze et al. |
| 9,955,937 | B2 | 5/2018 | Telfort |
| 9,965,946 | B2 | 5/2018 | Al-Ali et al. |
| D820,865 | S | 6/2018 | Muhsin et al. |
| 9,986,952 | B2 | 6/2018 | Dalvi et al. |
| D822,215 | S | 7/2018 | Al-Ali et al. |
| D822,216 | S | 7/2018 | Barker et al. |
| 10,010,276 | B2 | 7/2018 | Al-Ali et al. |

(56) References Cited

U.S. PATENT DOCUMENTS

| | | |
|---|---|---|
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| RE47,882 E | 3/2020 | Al-Ali |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf et al. |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |

(56) References Cited

U.S. PATENT DOCUMENTS

| | | |
|---|---|---|
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,031,729 S | 6/2024 | Forrest et al. |
| 12,004,869 B2 | 6/2024 | Kiani et al. |
| 12,014,328 B2 | 6/2024 | Wachman et al. |
| D1,036,293 S | 7/2024 | Al-Ali et al. |
| D1,037,462 S | 7/2024 | Al-Ali et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| 12,066,426 B1 | 8/2024 | Lapotko et al. |
| D1,041,511 S | 9/2024 | Indorf et al. |
| D1,042,596 S | 9/2024 | DeJong et al. |
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Kiani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| D1,060,680 S | 2/2025 | Al-Ali et al. |
| D1,061,585 S | 2/2025 | Indorf |
| D1,063,893 S | 2/2025 | DeJong et al. |
| 12,220,207 B2 | 2/2025 | Telfort et al. |
| 12,235,941 B2 | 2/2025 | Kiani et al. |
| 12,236,767 B2 | 2/2025 | Muhsin |
| D1,066,244 S | 3/2025 | Lim et al. |
| D1,066,672 S | 3/2025 | Al-Ali et al. |
| D1,068,656 S | 4/2025 | Trevisan et al. |
| D1,071,195 S | 4/2025 | Seung |
| D1,072,836 S | 4/2025 | Indorf |
| D1,072,837 S | 4/2025 | Ahmed et al. |
| 12,272,445 B1 | 4/2025 | Kiani |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0180140 A1 | 8/2007 | Welch et al. |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2011/0230733 A1 | 9/2011 | Al-Ali |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0253153 A1* | 10/2012 | Trumble ............ A61B 5/14551 600/324 |
| 2012/0283524 A1 | 11/2012 | Kiani et al. |
| 2013/0023775 A1 | 1/2013 | Lamego et al. |
| 2013/0041591 A1 | 2/2013 | Lamego |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0275883 A1* | 9/2014 | Haisley ............... A61B 5/6825 600/324 |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2016/0196388 A1 | 7/2016 | Lamego |
| 2016/0367173 A1 | 12/2016 | Dalvi et al. |
| 2017/0024748 A1 | 1/2017 | Haider |
| 2017/0173632 A1 | 6/2017 | Al-Ali |
| 2017/0251974 A1 | 9/2017 | Shreim et al. |
| 2018/0242926 A1 | 8/2018 | Muhsin et al. |
| 2018/0247712 A1 | 8/2018 | Muhsin et al. |
| 2019/0117070 A1 | 4/2019 | Muhsin et al. |
| 2019/0239787 A1 | 8/2019 | Pauley et al. |
| 2019/0320906 A1 | 10/2019 | Olsen |
| 2019/0374713 A1 | 12/2019 | Kiani et al. |
| 2020/0060869 A1 | 2/2020 | Telfort et al. |
| 2020/0111552 A1 | 4/2020 | Ahmed |
| 2020/0113435 A1 | 4/2020 | Muhsin |
| 2020/0113488 A1 | 4/2020 | Al-Ali et al. |
| 2020/0113496 A1 | 4/2020 | Scruggs et al. |
| 2020/0113497 A1 | 4/2020 | Triman et al. |
| 2020/0113520 A1 | 4/2020 | Abdul-Hafiz et al. |
| 2020/0138288 A1 | 5/2020 | Al-Ali et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0321793 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |

(56) References Cited

U.S. PATENT DOCUMENTS

| | | |
|---|---|---|
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2022/0071562 A1 | 3/2022 | Kiani |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Al-Ali |
| 2024/0298920 A1 | 9/2024 | Fernkbist et al. |
| 2024/0306985 A1 | 9/2024 | Vo et al. |
| 2024/0324953 A1 | 10/2024 | Telfort |
| 2024/0380246 A1 | 11/2024 | Moran |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |
| 2025/0037836 A1 | 1/2025 | Kiani |
| 2025/0100482 A1 | 3/2025 | Al-Ali et al. |
| 2025/0118415 A1 | 4/2025 | Olsen |

\* cited by examiner

SYSTEMS AND METHODS FOR ASSESSMENT OF PLACEMENT OF A DETECTOR OF A PHYSIOLOGICAL MONITORING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The disclosure relates to pulse oximetry, including wrist-based pulse oximetry and pulse oximetry in the presence of motion.

BACKGROUND

Pulse oximeters are inherently vulnerable to physical movement by the wearer. The movement introduces noise that can obscure the subtle signals used to determine an oxygen saturation measurement. Masimo Corporation of Irvine CA developed the first measure through motion system marketed under the name Masimo Signal Extraction Technology or SET. SET was designed measure through the types of motions typically found in a hospital setting. SET was also designed to be used with sensors worn on body parts with a high density of capillary beds (finger, ear, toe, nose, etc.).

SUMMARY

While measure through motion processing is useful in certain parts of the body with a high density of capillary beds, the wrist presents challenges to current measure through motion technology due to its low capillary density and weak signal. Current measure through motion processing was also not designed for normal everyday movements, such as exercising or significant movements not normally occurring in a hospital setting.

A non-invasive physiological sensor system implemented as a smart watch or other wearable device includes an emitter for emitting light and a detector for collecting light after the light interacts with a tissue of a wearer. The system can use light intensity measured at two or more radial distances to estimate attenuation parameter values that can be used to correct physiological parameter (for example, $SpO_2$) bias across subjects. In addition or alternatively, the system can determine whether a detector is positioned sufficiently proximate to an obstructing tissue (for example, an artery or vein) so as to cause inaccurate measurements by the detector.

BRIEF DESCRIPTION OF THE DRAWINGS

The drawings and the associated descriptions are provided to illustrate embodiments of the disclosure and not to limit the scope of the claims.

DETAILED DESCRIPTION

The drawings and the associated descriptions are provided to illustrate embodiments of the disclosure and not to limit the scope of the claims.

Although certain embodiments and examples are described below, those of skill in the art will appreciate that the disclosure extends beyond the specifically disclosed embodiments and/or uses and obvious modifications and equivalents thereof based on the disclosure herein. Thus, it is intended that the scope of the disclosure herein disclosed should not be limited by any particular embodiments described below.

In finger-based pulse oximetry, light from sensors scatters around the bone and fatty tissue through rich capillary beds. The scattered light has a relatively constant path length, which is important in a ratio approach to pulse oximetry. In measuring physiological parameters from a wrist, however, light may be flooded over a larger surface area having few capillaries and scattered light may not have a constant path length. Additionally, while a finger has a lot of capillaries and no significant arteries or veins, a wrist has few capillaries and includes arteries and veins. Veins in particular are problematic due to their relative proximity to the surface and much higher attenuation resulting in increased physiologic noise. There is a certain amount of positional randomness in light scattering from a vein or artery. Additionally, perfusion on a wrist may be significantly lower than perfusion on a finger, making pulse oximetry much more difficult on a wrist. Thus, a different approach to pulse oximetry on a wrist over a finger is needed in order to account for these differences. Described herein are systems and methods for pulse oximetry on an area of the body other than a finger or digit, such as a wrist. Advantageously, systems and methods described herein may allow for more accurate and consistent measurement of physiological parameters using a non-invasive sensor in a smart watch or other device configured to measure parameters from the body of a user.

Overview of Wearable Device Including a Plethysmograph Module

Figure 1:
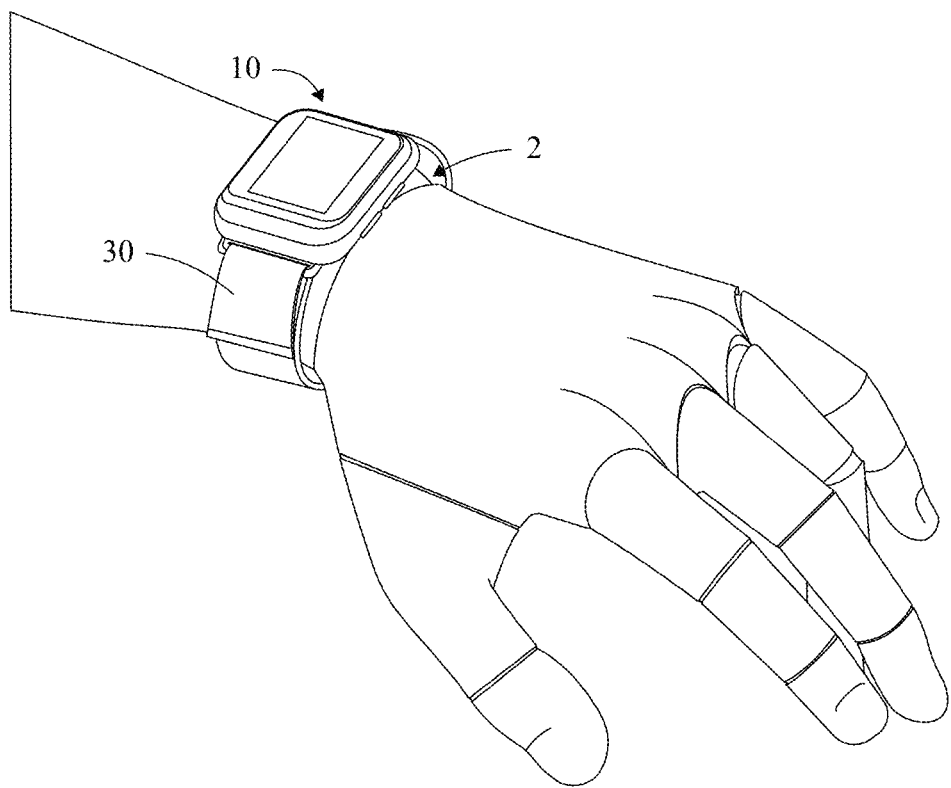
FIG. 1 illustrates an example wearable device including a plethysmograph module worn on a wrist.

Daily use of a wearable plethysmography monitoring device, which can monitor oximetry-based physiological parameters, can be beneficial to the wearer. The device, such as a device 10 as shown in FIG. 1, can be a wristwatch (also referred to as a "watch") incorporating a plethysmograph sensor or a wrist-worn plethysmograph sensor with built-in watch or time-indicating functions. The device 10 can include an adjustable strap 30 to releasably secure the device 10 around the wrist 2 of the wearer. The wearer can be informed of physiological parameters, such as vital signs including but not limited to heart rate and oxygen saturation (SpO$_2$). Of course, the present specification is not limited solely to a watch, but can include other embodiments. For example, the sensor can be worn on the wrist without a watch, screen or other smartwatch features.

Various Example Components of the Wearable Device

Figure 2A:
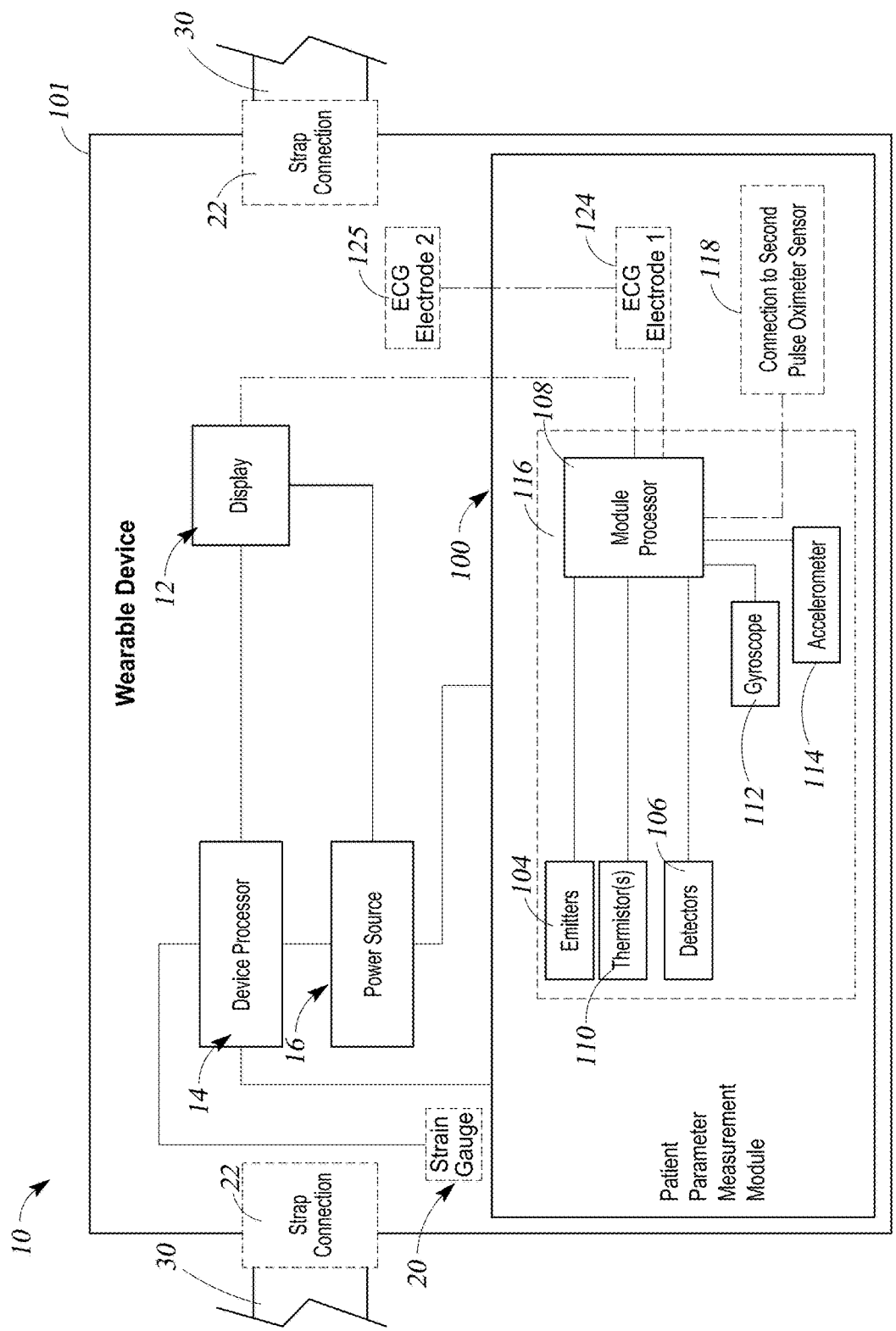
FIG. 2A is a schematic system diagram illustrating a wearable device including a plethysmograph module.
Figure 2B:
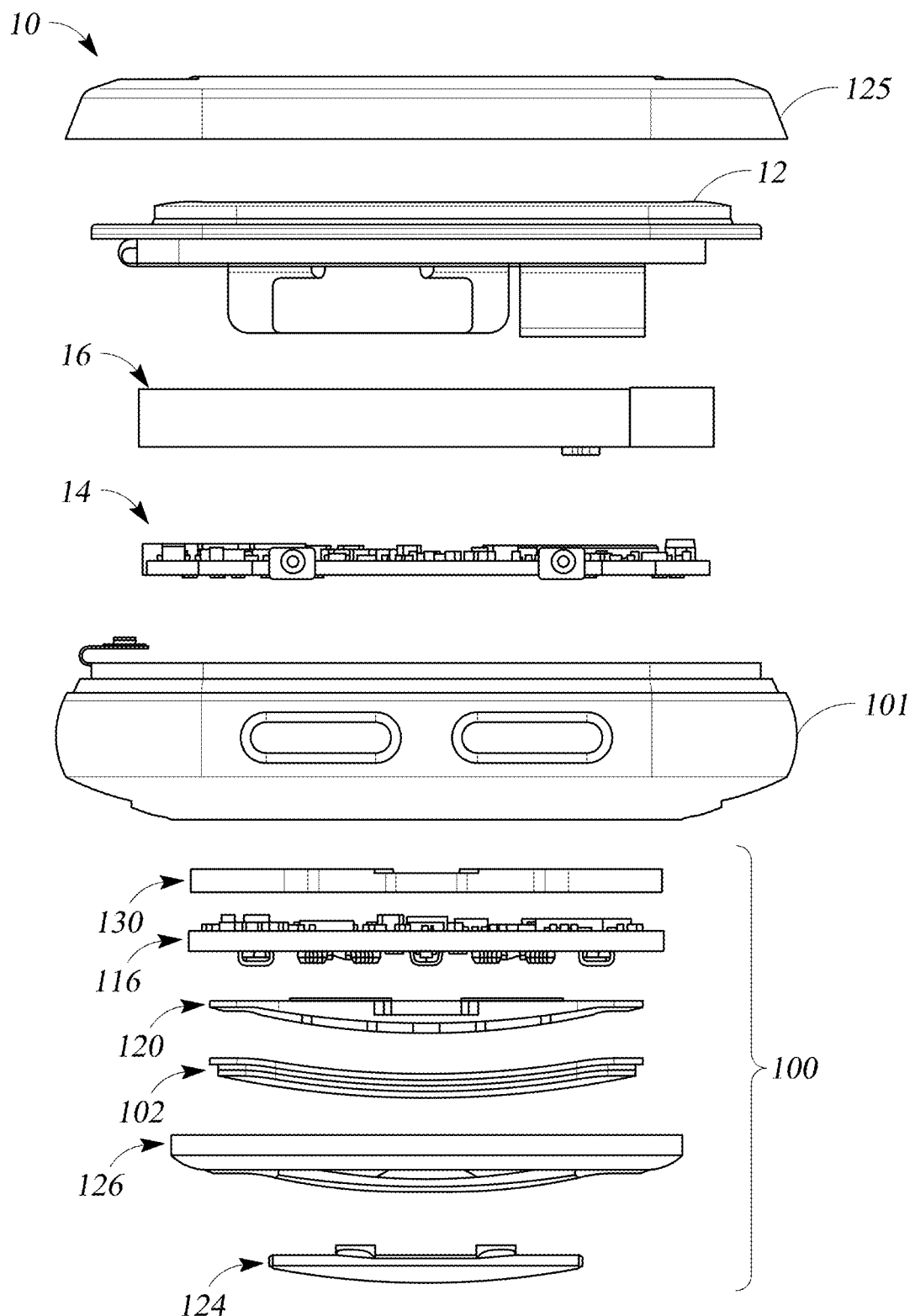
FIG. 2B illustrates a partially exploded view of an example wearable device.

Components of the wearable device will now be described. As shown in FIG. 2A and FIG. 2B, the device 10 can include its own device processor 14, which can be a digital/analog chip or other processor(s), such as a digital watch processor or a smartwatch processor. As shown in FIG. 2B, the device processor 14 can be located on a PCB. As shown in FIG. 2A and FIG. 2B, the device 10 can include a power source 16, which can be a battery, for powering the device processor 14, the display screen 12, and/or the physiological parameter measurement module 100. The battery 16 can last at least 10 hours, or at least 12 hours, or at least 14 hours, or at least about 16 hours after each charge, with continuous measurements and/or displaying of certain physiological parameters, such as SpO$_2$ and pulse rate.

The device 10 can be configured to display time after the battery 16 has been depleted, even if other features (for example, measuring physiological parameters using the module) may not be available when the battery 16 has been depleted. Additionally, when the device 10 is used clinically, the display 12 can also continue displaying critical patient information (for example, the patient's name, date of admission, etc.) after the battery 16 has been depleted. The device 10 may include nonvolatile memory to store the critical patient information. The device 10 can include a dual-battery configuration with a main battery and a backup battery. Power management of the device 10 may switch automatically for the device 10 to be powered by the backup battery when the main battery has been depleted. The device can additionally or alternatively be configured to be solar-powered, for example, by including a solar panel on the dial or elsewhere of the wearable device 10. The display 12 of the device 10 can use e-ink or ULP (ultra low power screen) technology, which draws little amount of current for displaying information. The display 12 may automatically adjust the brightness, being brighter when outdoors and dimmer when indoors to further prolong battery life.

As shown in FIG. 2A and FIG. 2B, the sensor or module 100 of the wearable device 10 can include a sensor or module processor 108 (which can include a memory and/or other electronics). The sensor or module processor 108 can process signals from one or more of the sensors in the sensor or module 100 (or optionally other sensors in communication with the device 10) to determine a plurality of physiological parameters. All the processing of the raw sensor data of the sensors in communication (via a wired and/or wireless connection) with the sensor or module processor 108 may be performed by the sensor or module processor 108. The sensor or module processor 108 can be configured to drive the emitters 104 to emit light of different wavelengths and/or to process signals of attenuated light after absorption by the body tissue of the wearer from the detectors 106. The sensor or module processor 108 can determine and output for display on the device display screen 12 the physiological parameters based on the detected signals. Optionally, the sensor or module 100 can send the signals from the detectors 106 (for example, preprocessed signals) to the device processor 14, which can determine and output for display the physiological parameters based on the detected signals. The absorption of light can be via trans-reflectance by the wearer's body tissue, for example, by the pulsatile arterial blood flowing through the capillaries (and optionally also the arteries) within a tissue site where the device 10 is worn (for example, the wrist). The sensor or module processor 108 can be located on a PCB 116, such as shown in FIG. 2B.

The module 100 is configured to measure an indication of the wearer's physiological parameters. This can include, for example, pulse rate, respiration rate, SpO$_2$, Pleth Variability Index (PVI), Perfusion Index (PI), Respiration from the pleth (RRp), total hemoglobin (SpHb), hydration, glucose, blood pressure, and/or other parameters. The module 100 can perform intermittent and/or continuous monitoring of the measured parameters. The module 100 can additionally and/or alternatively perform a spot check of the measured parameters, for example, upon request by the wearer.

The sensor or module 100 can include more than one group or cluster of light emitters (such as LEDs) 104 and more than one group of photodetectors (also referred to as "detectors") 106. Each group of emitters 104 can be configured to emit four (or more) different wavelengths described herein. The sensor or module 100 can include one or more thermistors 110 or other types of temperature sensors. The thermistor(s) 110 can be placed near one or more groups of emitters 104. There can be at least one thermistor 110 near each group of emitters 104. The thermistor(s) 110 can provide for wavelength correction of the light emitted by the emitters 104. Optionally, the thermistor(s) 110 can additionally measure a temperature of the wearer of the device 10. Optionally there can be one or more thermistors 110 located at other places of the sensor or module 100. The emitters 104, the thermistor(s) 110, and/or the detectors 106 can be positioned on the PCB 116.

The emitters 104 of the plethysmograph module 100 can be configured to emit a plurality of (for example, three, four, or more) wavelengths. The emitters 104 can be configured to emit light of a first wavelength providing an intensity signal that can act as a reference signal. The first wavelength can be more absorbent by the human body than light of other wavelengths emitted by the emitters 104. The reference signal can be used by the plethysmograph module processor 108 to extract information from the other signals, for example, information relevant to and/or indicative of the pulsing rate, harmonics, or otherwise. The plethysmograph module processor 108 can focus the analysis on the extracted information for calculating the physiological parameters of the wearer. The first wavelength can include a range of wavelengths, including, for example, from about 530 nm to about 650 nm, or from about 580 nm to about 585 nm, or from about 645 nm to about 650 nm, or about 580 nm, or about 645 nm. The light providing the reference signal can have an orange color. Alternatively, the light providing the reference signal can have a green color.

The emitters 104 can be configured to emit light of a second wavelength having a red or orange color. The second wavelength can be from about 620 nm to about 660 nm. Light of the second wavelength can be more sensitive to changes in $SpO_2$. The second wavelength is preferably closer to 620 nm, which results in greater absorption by the body tissue of the wearer, and therefore a stronger signal and/or a steeper curve in the signal, than a wavelength that is closer to 660 nm. The plethysmograph module processor 108 can extract information such as the pleth waveform from signals of the second wavelength. The emitters 104 can be configured to emit light of a third wavelength of about 900 nm to about 970 nm, or about 905 nm, or about 907 nm. The pulse oximeter processor can use the third wavelength as a normalizing wavelength when calculating ratios of the intensity signals of the other wavelengths.

Additionally or optionally, the emitters 104 can be configured to emit light having a fourth wavelength that is more sensitive to changes in water than the rest of the emitted wavelengths. The fourth wavelength can be about 970 nm or higher than 970 nm. The plethysmograph module processor 108 can determine physiological parameters such as a hydration status of the wearer based at least in part on a comparison of the intensity signals of the fourth wavelength and a different wavelength detected by certain detectors 106.

The device 10 can optionally include one or more thermistors 110 or other types of temperature sensors. The thermistor(s) 110 can be placed near one or more groups of emitters 104. The thermistor(s) 110 can provide for wavelength correction of the light emitted by the emitters 104. Optionally, the thermistor(s) 110 can additionally measure a temperature of the wearer of the device 10. Optionally, there can be one or more thermistors 110 located at other places of the module 100. The emitters 104, the thermistor(s) 110, and/or the detectors 106 can be positioned on a printed circuit board (PCB) 116. The device 100 can include a gyroscope 112, an accelerometer 114, and/or other position and/or posture detection sensor(s). Optionally, the module processor 108, the gyroscope 112, and/or the accelerometer 114 can be located on the PCB 116. The gyroscope 112 and/or the accelerometer 114 can be in electrical communication with the module processor 108. Optionally, the device can include an electrocardiogram (ECG) sensor including a plurality of electrodes 124, 125 configured to make contact with the wearer's skin. One or more ECG electrodes 124 may be located on the module 100. One or more ECG electrodes 125 may be located elsewhere on the device 10. The ECG sensor can be in electrical communication with the module processor 108. The module processor 108 can process signals from one or more of the sensors in the module 100 to determine a plurality of physiological parameters. Optionally, all the processing of the raw sensor data of the sensors in communication with the module processor 108 is performed by the module processor 108.

Figure 5:
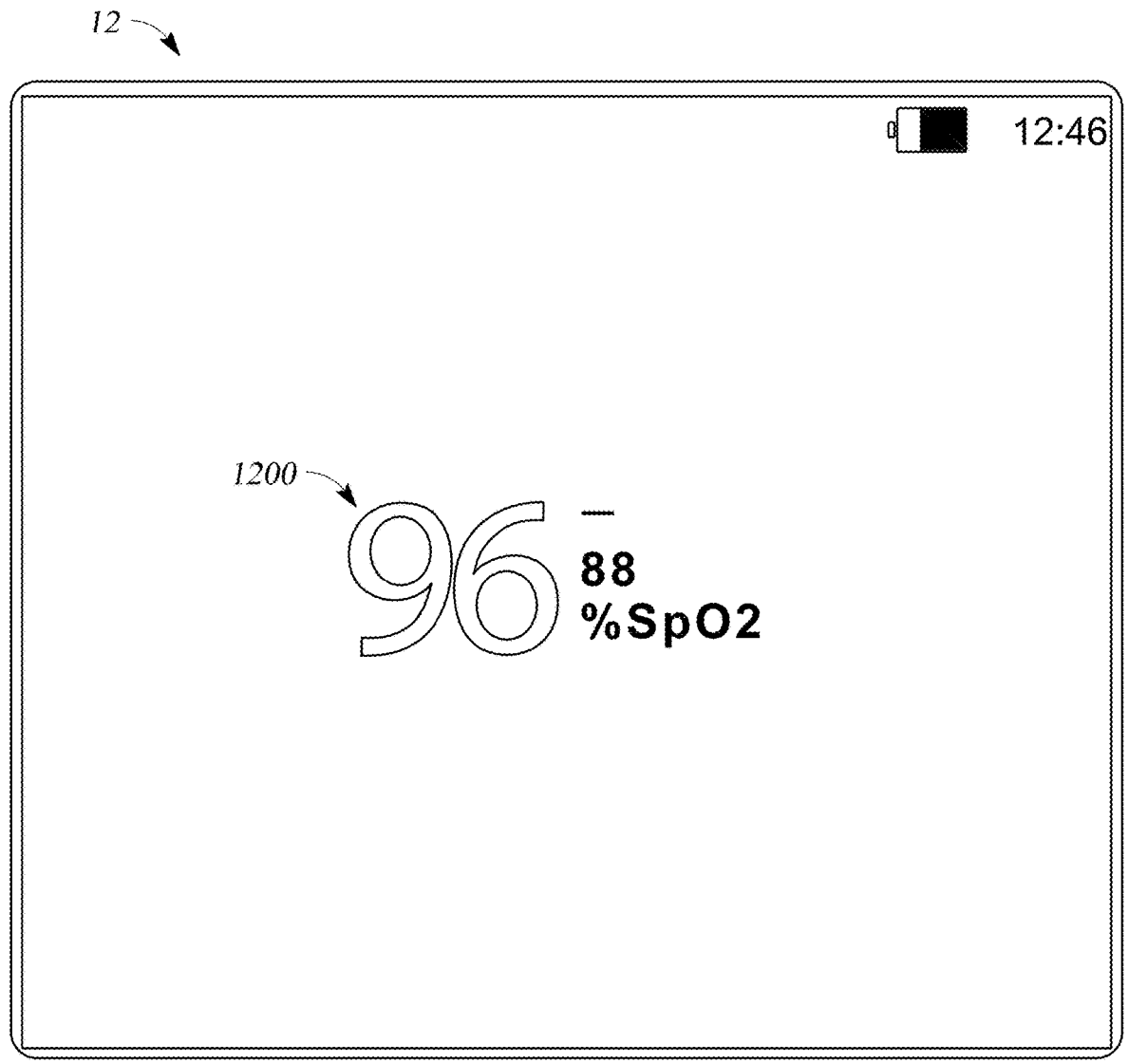
FIG. 5 to FIG. 6 illustrate example displays of physiological parameter(s) measured by the wearable device.
Figure 6:
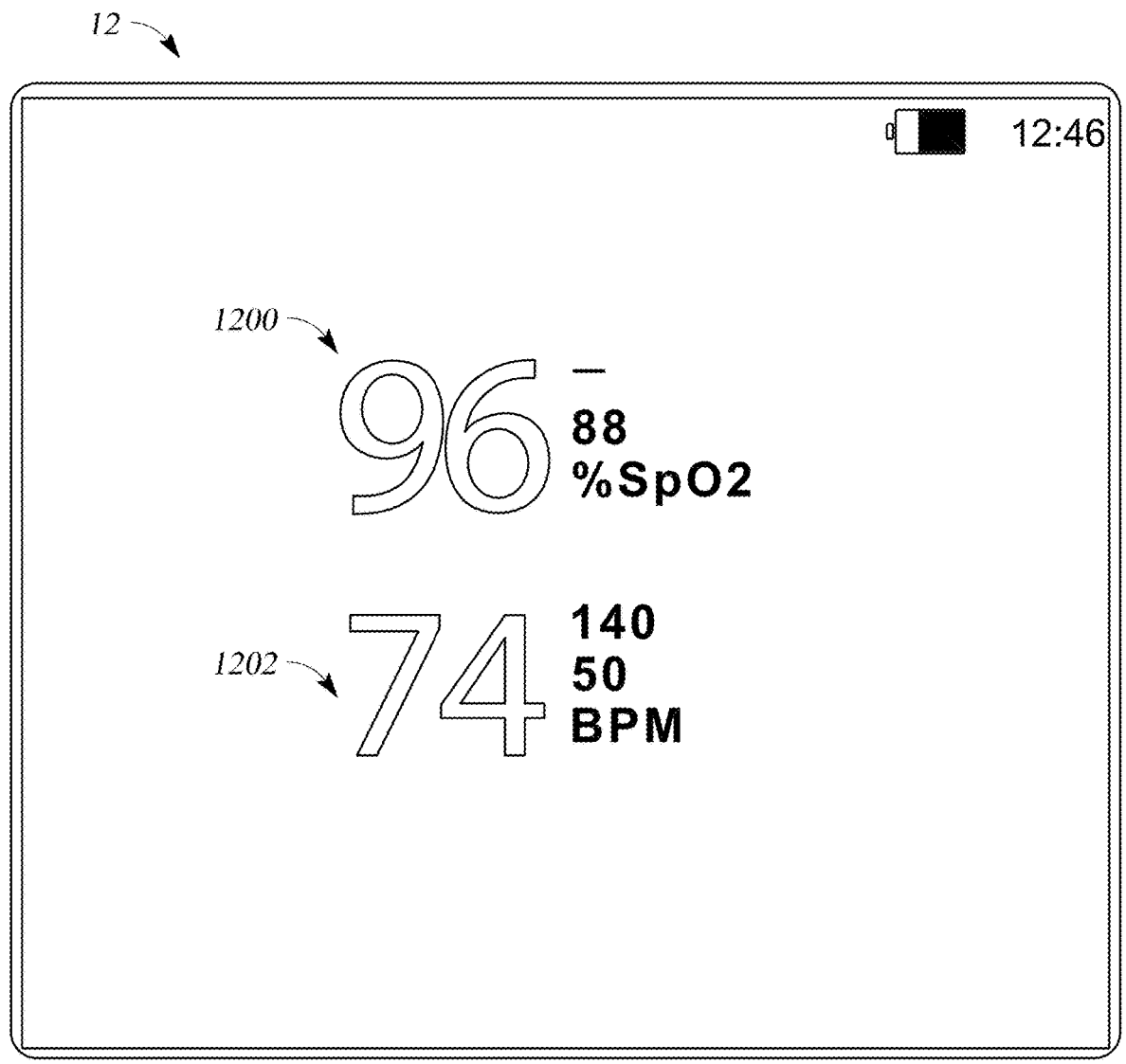

As shown in FIG. 2A, the device 10 can include its own device processor 14, which can be a digital/analog chip or other processor(s), such as a digital watch processor or a smartwatch processor. The device 10 can include a power source 16, which can be a battery, for powering the device processor 14, the display screen 12, and/or the plethysmograph module 100. FIG. 5 illustrates an example display of the wearer's $SpO_2$ measurement 1200 on the display screen 12. FIG. 6 illustrates an example display of the wearer's $SpO_2$ measurement 1200 and pulse rate measurement 1202 on the display screen 12. The display screen 12 can additionally or alternatively display other parameters, or combinations thereof, monitored by the module 100.

Optionally, the plethysmograph module 100 can be pre-assembled before being integrated into the device 10. An electrical connection can be established between the plethysmograph module PCB 116 and the circuit of the rest of the device 10, including for example, the device processor 14, the display 12, and the power source 16. The plethysmograph module 100 can be characterized before being assembled with the rest of the device 10. Alternatively, a housing of the plethysmograph module can be an integral component of a housing of the device.

As shown in FIG. 2A, the device 100 can include a gyroscope 112, an accelerometer 114, and/or other position and/or posture detection sensor(s). The gyroscope 112 and/or the accelerometer 114 can be in electrical communication with the sensor or module processor 108. The sensor or module processor 108 can determine motion information from signals from the gyroscope 112 and/or the accelerometer 114. The motion information can provide noise reference for analysis of the pleth information and other signal processing (for example, processing of ECG signals) performed by the sensor or module processor 108. The gyroscope 112 and/or the accelerometer 114 can be located on the PCB 116.

Optionally, as shown in FIG. 2A and FIG. 2B, the device 10 can include an electrocardiogram (ECG) sensor including a plurality of electrodes 124, 125 configured to make contact with the wearer's skin. One or more ECG electrodes 124 may be located on the sensor or module 100 (such as shown in FIG. 2B). One or more ECG electrodes 125 may be located elsewhere on the device (for example, an ECG electrode 125 can form a part of the housing of the wearable device 10 as shown in FIG. 2B). The ECG sensor can be in electrical communication with the sensor or module processor 108 via an ECG connector.

As shown in FIG. 2B, the physiological parameter measurement module 100 can include a skin-interfacing light transmissive cover 102 that encloses the first side of the PCB 116, which positions the plurality of light emitters 104 and detectors 106. The sensor or module 100 can include a light barrier construct 120 that is configured to divide the emitters 104 and the detectors 106 into different chambers such that light cannot travel or substantially cannot travel between the chambers. The light transmissive cover 102 can extend over the various emitter and detector chambers formed by the light barrier construct 120 and the PCB 116. The light transmissive cover 102 can include individual lenses or covers, a single lens or cover, or a combination of individual emitter chamber covering lenses or covers and a single lens or cover covering a plurality of detector chambers. In the example lens or cover 102b, the individual lenses or covers that are configured to cover the detector chambers can be interconnected with bridging portions 103 between the detector chambers, forming a single piece of lens or cover. The lens or cover 102b can be combined with the lenses or covers 102a covering the emitter chambers to cover all the openings in the light barrier construct 120 for forming sealed emitter and detector chambers. The light barrier construct 120 can be overmoulded to the lens or cover 102b and the lenses or covers 120a. The lens or cover 102b may not be configured to cover the emitter chambers, which can be covered by individual lenses, so as to avoid any light traveling between an emitter chamber and a detector chamber.

As shown in FIG. 2B, the physiological parameter measurement module 100 can include an opaque frame 126. The opaque frame 126 can accommodate the light barrier construct 120. Alternatively, the opaque frame 126 and the light barrier construct 120 can form an integral piece. The opaque frame 126 can include indentations having the shape and size to accommodate the ECG electrodes 124 or other components with a suitable shape and size. A front side of the electrodes 124 can have one or more posts 137 extending past openings in the opaque frame 126 into corresponding openings on the PCB 116. The posts 137 of the electrodes 124 can establish an electrical connection with the corresponding openings of the PCB 116. A plurality of screws (or other types of fasteners) can extend into the corresponding openings of the PCB 116 from the front side of the PCB 116 to secure the electrodes 124 to the sensor or module 100 by threadedly mating or otherwise with the posts 137. When a wearer puts the wearable device incorporating the sensor or module 100 onto the wearer's wrist, the electrodes 124 can make contact with the wearer's skin.

The tightness of the device 10 in the wearer's body (for example, the wrist) can be adjusted by adjusting any suitable strap(s) 30 used to secure the device 10 to the wearer's body. The strap(s) 30 can be connected to the device 10 using any suitable strap connections 22. For example, the strap connections 22 can be compatible with third party watch bands, wearable blood pressure monitors, and/or the like. The adjustment of the strap 30 around the wearer's wrist can reduce and/or eliminate a gap between a tissue-facing surface of the plethysmograph module 100 and the wearer's skin to improve accuracy in the measurements. The device 10 can include an optional strain gauge 20 to measure a pressure of the device 10 on the wearer. The strain gauge 20 can be located in a device housing 101 between the plethysmograph module 100 and other components of the device 10, for example, the power source 16, the device processor 14, or otherwise. When the device 10 is worn on the wearer, for example, on the wrist, the pressure exerted by the module 100 against the tissue can be transmitted to and measured by the strain gauge 20. Readings from the strain gauge 20 can be communicated to the device processor 14, which can process the readings and output an indication of the pressure asserted by the device 10 on the wearer to be displayed on the display 12. Optionally, the device 10 can output a warning that the device 10 is worn too tight when the device 10 has determined that the wearer's $SpO_2$ readings are decreasing by a certain percentage, at a certain rate, and/or at a certain rate within a predetermined amount of time.

The plethysmograph modules disclosed herein can include an optional connector 118 for receiving a second sensor, which can be a second plethysmograph sensor such as a fingertip sensor configured to monitor opioid overdose, or any other suitable noninvasive sensor, such as an acoustic sensor, a blood pressure sensor, or otherwise. The connector 118 can be oriented such that the second sensor can extend from a housing of the device 10 with reduced or no impingement of the tissue at the device/tissue interface, resulting in less or no effect of the connector 118 or the second sensor on the blood flow through the device measurement site.

Example Plethysmograph Modules

Figure 3A:
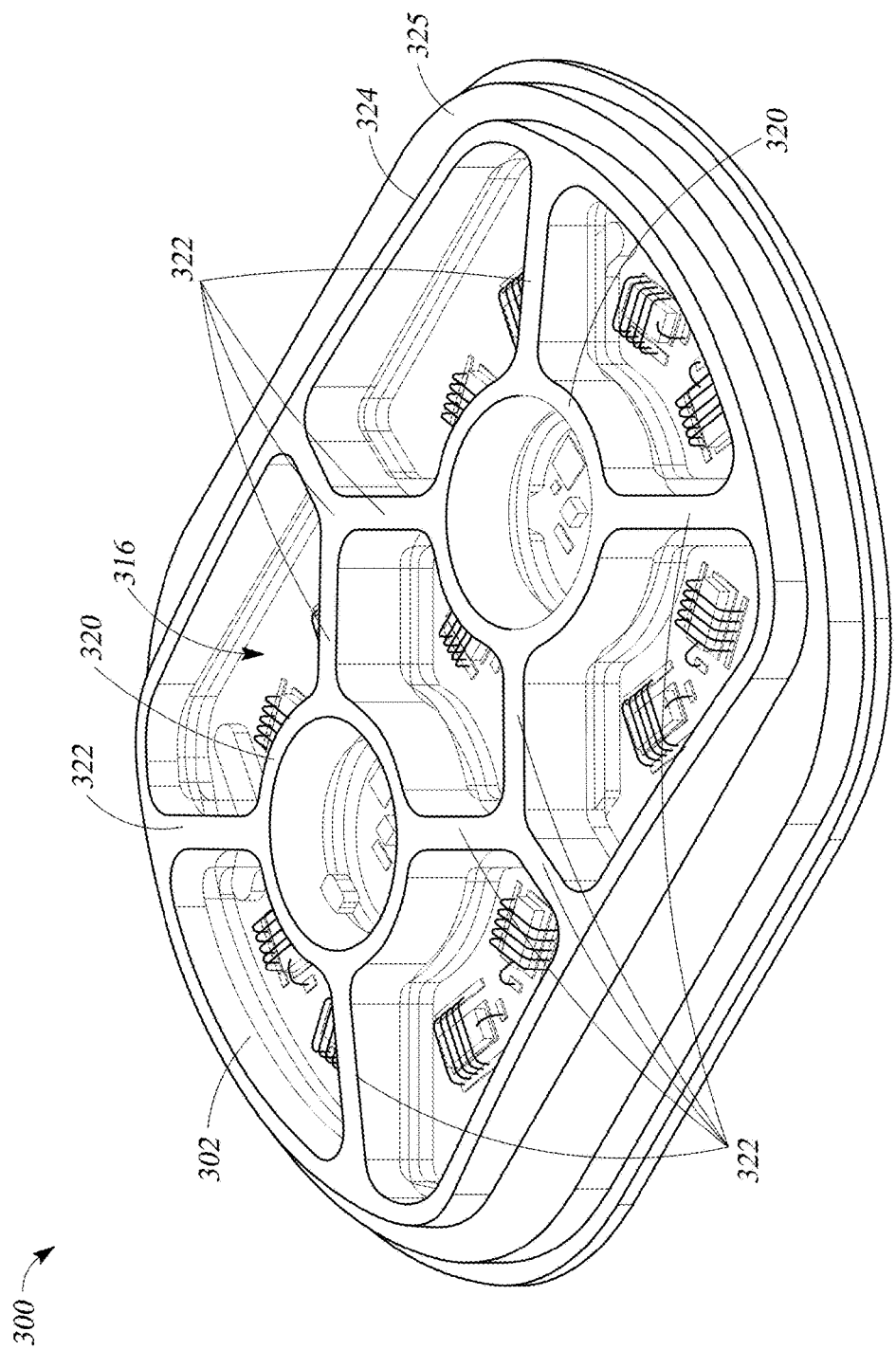
FIG. 3A illustrates a bottom perspective view of an example plethysmograph module of a wearable device.
Figure 3B:
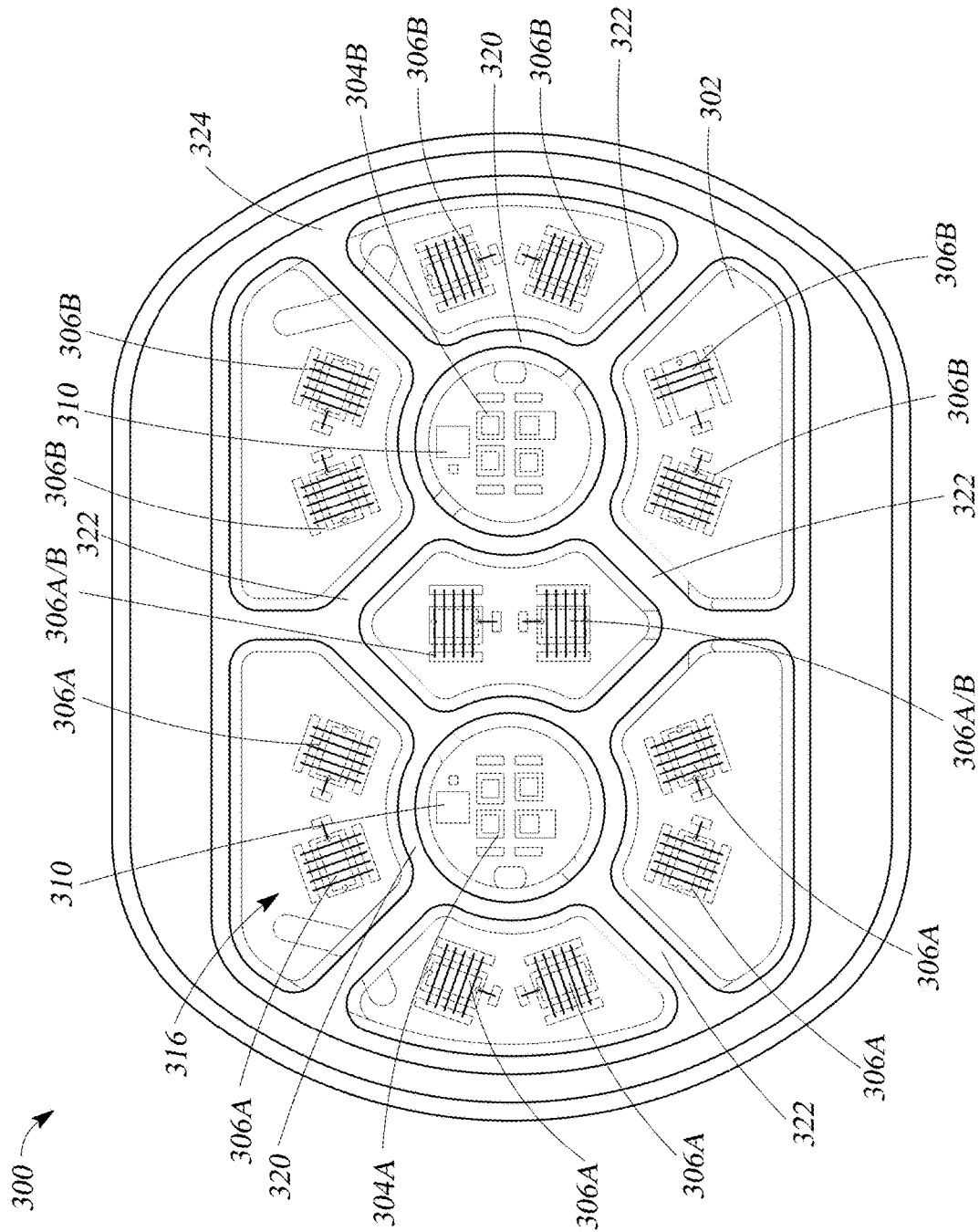
FIG. 3B illustrates a bottom view of the example plethysmograph module of FIG. 3A.

An example of the plethysmograph module described above can include two groups of emitters that are separated from each other by one or more light barriers, such as shown in FIG. 3A to FIG. 3B. The plethysmograph module 300 can include a first group of emitters 304a and a second group of emitters 304b. Each group of emitters can include four emitters (or optionally a different number of emitters, such as six or eight emitters). The emitters in each group 304a, 304b can emit at least the first, second, third, and fourth wavelengths as described above. The emitters 304a, 304b can be activated simultaneously and/or sequentially. The module 300 can include a temperature sensor 310 as described above near the first and second group of emitters 304a, 304b respectively.

The PCB 316 can be elliptical in shape. The two groups of the emitters 304a, 304b can be located on two parts of a generally central portion of the PCB 316 divided along the minor diameter of the ellipse. The shape of the PCB 316 can vary, for example, including oval, circular, rectangular, square, or otherwise. The first and second groups of emitters 304a, 304b can be located a distance from each other. The two groups of the emitters 304a, 304b can each be surrounded by a first light barrier 320.

The first and second groups of emitters 304a, 304b in the module 300 can be surrounded by two rings of detectors 306a, 306b that are separated from the first and second groups of emitters 304a, 304b by the first light barrier 320. The two rings of detectors 306a, 306b can share a plurality of (for example, two or more) detectors 306a/b common to both rings. The detectors 306a/b common to both rings can be located along the minor axis of the ellipse. In the illustrated example, the module 300 can include fourteen detectors, but the module 300 can also include a different total number of detectors.

The detectors 306a can be the far detectors for the second group of emitters 304b and the detectors 306a, 306a/b can be the near detectors for the first group of emitters 304a. The detectors 306b can be the far detectors for the first group of emitters 304a and the detectors 306b, 306a/b can be the near detectors for the second group of emitters 404b. Accordingly, each detector 306a, 306b, 306a/b can receive two signals for each wavelength emitted by the first and second groups of emitters 304a, 304b respectively. Signals outputted by the far and near detectors can provide different information due to the different light paths, which can travel through different areas of the tissue.

As shown in FIG. 3A and FIG. 3B, the detectors 306a, 306b, 306a/b can be separated or partitioned into seven detector regions by portions of the first light barrier 320 and second light barriers 322. Each detector region can include two detectors, or any other number of detectors. Along an outer perimeter of the module 300, the detectors 306a, 306b, 306a/b can be enclosed within a module side wall 324. A module processor of the module 300 can process signals from the detectors within the same detector region as one signal source. Accordingly, for each wavelength, the module processor can receive data from a total of fourteen signal sources, two from each detector region acting as the far and near detectors for the different groups of emitters respectively.

The plethysmograph module 300 can monitor a hydration status of the wearer using the DC bulk absorption measurements of the signals detected by the detectors. At the DC level, water can act as a light block for the fourth wavelength and as a lens for the other wavelengths. Each detector region can provide two measurements calculated from the signals received from the closer emitter group and the signals from the further emitter group. Signals detected at the far detectors can provide indication of the hydration status of the wearer. Signals detected at the near detectors can be used as reference or for comparison with the signals detected at the far detectors. The module processor can compare intensity signals of the fourth wavelength and another wavelength (for example, about 905 nm) that is less sensitive to changes in water from one of the far detectors. When the wearer's hydration status is in a normal range such that the wearer is not considered dehydrated in a medical sense, the signals of the fourth wavelength and the other wavelength can show the opposite trends, that is, one is increasing when the other one is decreasing. When the wearer becomes dehydrated in a medical sense, the opposite trends can become less distinct, for example, falling below a threshold.

As a person's hydration status is not expected to change rapidly, the plethysmograph module can optionally make a measurement of the hydration status less frequently than making measurements related to the wearer's pulse rate or $SpO_2$ or other parameters. For example, the plethysmograph module processor can make a measurement of hydration status every 5 minutes, or longer, and/or upon (for example, only upon) a request by the wearer, such as when the wearer presses a button (physical and/or a touch button on the display 12) on the device or otherwise instructs the device using voice commands, hand gestures, and/or the like.

Figure 3C:
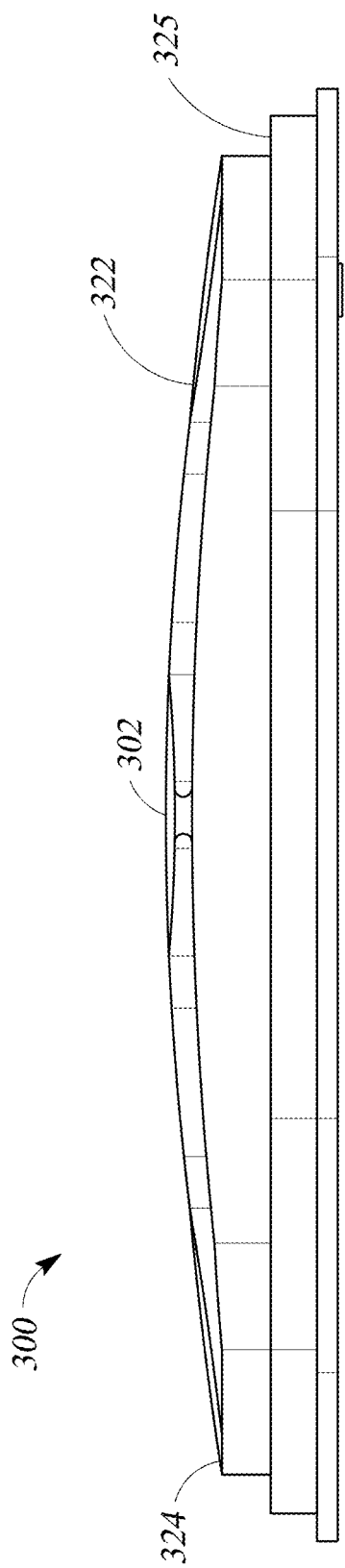
FIG. 3C illustrates a side view of the example plethysmograph module of FIG. 3A.

On the first side of the PCB 316, the module 300 can be enclosed by a curved lens or cover 302, which can include a single cover or multiple pieces of covers. As shown in FIG. 3C, the lens 302 can have a continuous curvature. The first and second light barriers 320, 322, and of the side wall 324 can extend from the first side of the PCB 316 to a tissue-facing surface of the module 300, generally following the curvature of the lens 302. The light barriers 320, 322 can extend to the lens 302 so that when the module 300 is pressed into the skin of the wearer of a device (see FIG. 1) incorporating the module 300, the upper surfaces of the first and second light barriers 320, 322, and of the side wall 324 can be configured to contact the skin of the wearer. The tissue-facing surface of the module 300 can include a continuous curvature. The pressure exerted by the curvature of the tissue-facing surface of the module 300 on the skin can increase a light illuminated and/or detection area, improve the optical coupling of the emitted light and the blood vessels and/or of the reflected light and the detectors, and/or reduce stagnation of the blood. The curvature can be configured so as to balance the pressure needed to improve contact between the tissue-facing surface of the module 300 and the skin, and the comfort of the wearer.

The PCB 316, the first and second light barriers 320, 322, the side wall 324, and the lens 302 can form a module housing. The first side of the PCB 316, which is enclosed by the module housing, can include the emitters 304a, 304b, detectors 306a, 306b, 306a/b, temperature sensor 310, and optionally any other sensors, for example, the gyroscope, the accelerometer, and/or the like. The second side of the PCB 316 opposite the first side can include the module processor, optionally any additional sensors, and other circuit hardware. On the second side of the PCB 316, the PCB 316 can be covered by melt plastic or other suitable electronics protective material.

The module housing can include a plurality of chambers separating the emitters groups and the detector regions such that light cannot travel between the chambers because of the various light barriers described herein. Light diffusing materials can be added above and around the emitters 304a, 304b, and/or optionally above and around the detectors 306a, 306b, 306a/b, to improve distribution of emitted lighted and/or detected light after attenuation by the tissue. The diffusing materials can be any suitable materials, for example, glass, ground glass, glass beads, opal glass, greyed glass, polytetrafluoroethylene, or a microlens-based, band-limited, engineered diffuser. The diffusing materials can include a flow of glass microsphere solution injected into the chambers and UV-cured. The lens 302 can also include glass microspheres. The light diffusing materials in the lens 302 and the chambers and/or the first light barrier 320 can make the emitted light leave the chambers enclosing the emitters 304a, 304b in a direction generally parallel to the height of the first light barrier 320. The light diffusing materials in the lens 302 and the other chambers can increase the amount of reflected light being directed to and detected by the detectors 306a, 306b, 306a/b.

Example Plethysmograph Modules

Figure 4A:
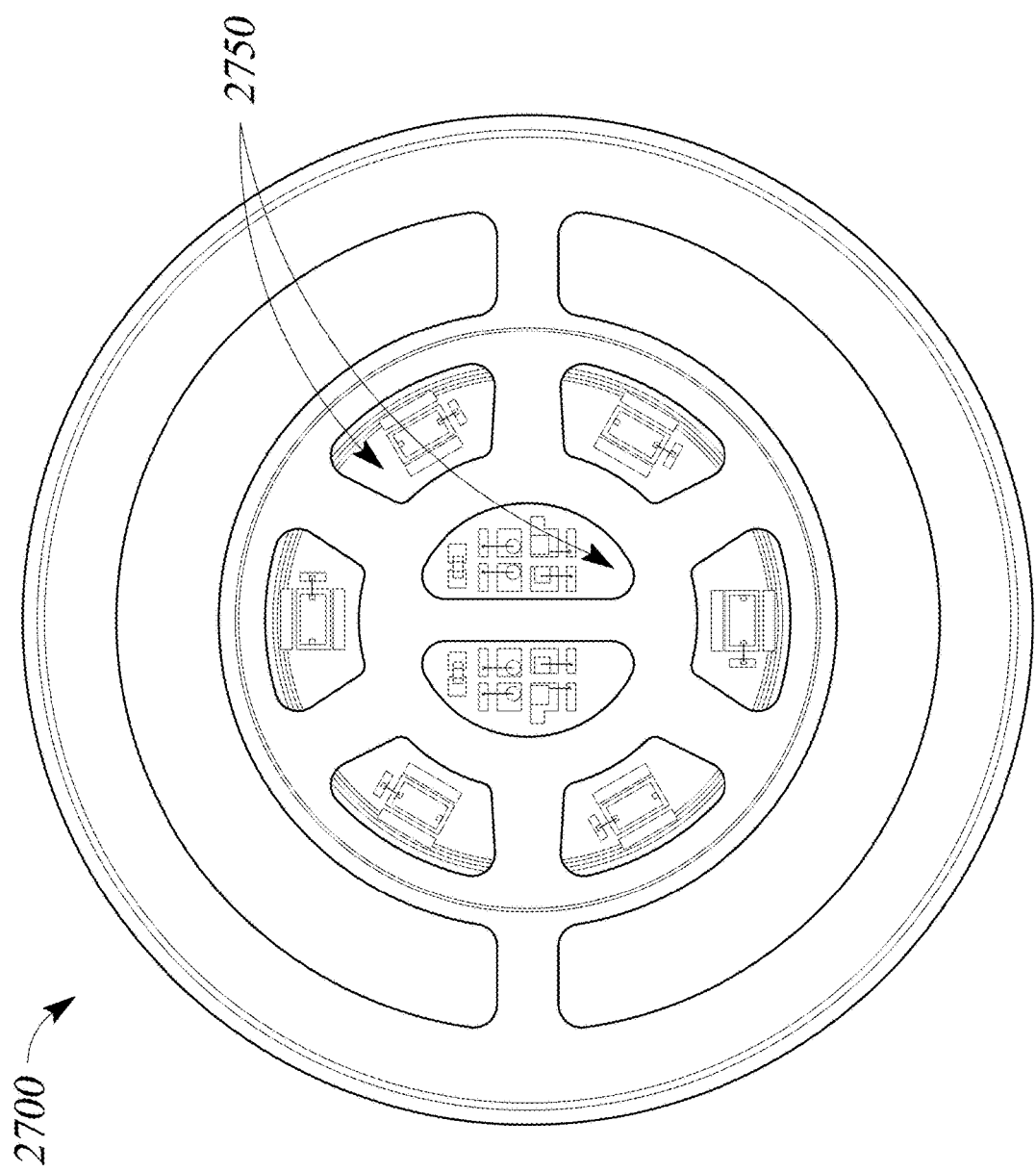
FIG. 4A illustrates a top view of an example embodiment of a physiological parameter measurement sensor or module.

FIG. 4A illustrates an additional example configuration of a sensor or module. In some examples, the opaque frame 2726 may be configured such that the fill holes 2744 and channels 2746 allow the light diffusing materials to fill only the emitter chambers, or only the detector chambers, or both the emitter and detector chambers. As shown in FIG. 4A, in addition or alternative to the light diffusing materials, a bottom surface of each emitter and/or detector chambers can include a light-reflective surface material 2750. Optionally, as shown in FIG. 4A, substantially an entire central area of the PCB 2716 may include the light-reflective surface 2750. The light-reflective surface material 2750 can help in focusing the reflected light onto the detector inside each detector chamber to improve the amount of light captured by the detector. The light-reflective surface material 2750 can help in better distributing the light emitted by the emitters inside each emitter chamber to further facilitate making the light emitted by the different emitters in each emitter chamber appear as if coming from a single point source.

Figure 4B:
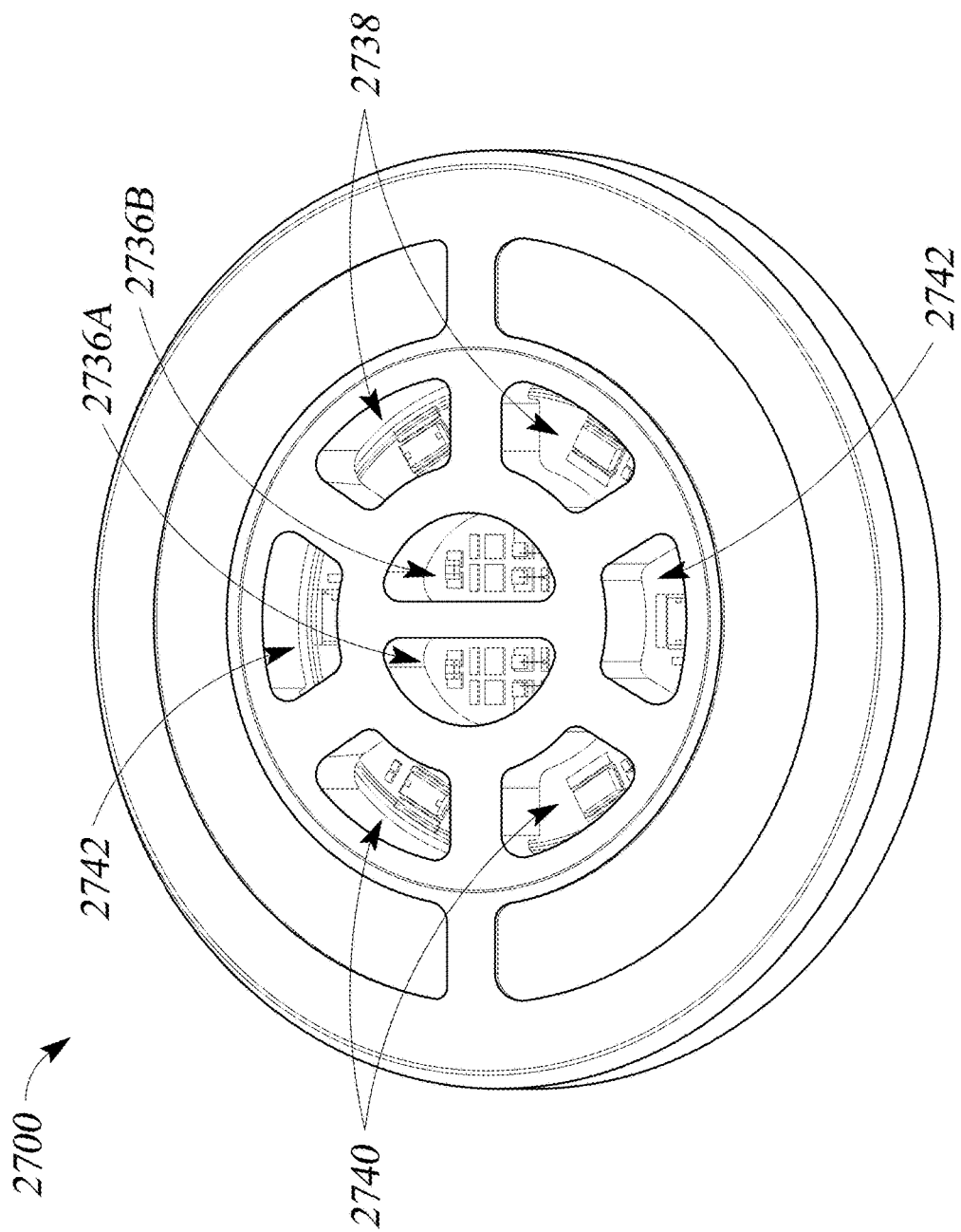
FIG. 4B illustrates an example physiological parameter measurement sensor or module and example light paths between emitters and detectors of the module.

In FIG. 4B, the sensor or module 2700 can include a different arrangement of emitter and detector chambers. The emitter and detector chambers may comprise one or more light blocks. The chambers include a first emitter chamber 2736a enclosing a first emitter group, a second emitter chamber 2736b enclosing a second emitter group, a first group of detector chambers 2740, a second group of detector chambers 2742, and a third group of detector chambers 2738. Each detector chamber can enclose one detector. The first and second emitter chambers 2736a, 2736b can be adjacent to each other. The first, second and third groups of detector chambers 2740, 2742, 2738 can extend around the first and second emitter chambers 2736a, 2736b.

As shown in FIG. 4B, light from the first and second emitter groups in the first and second emitter chambers, respectively, can emit light that travel paths of different lengths for example to different detectors. Light from the first emitter group can travel a shorter path, as indicated by the shorter arrows, to the first group of detector chambers 2740; and light from the first emitter group can travel an intermediate path, as indicated by the intermediate arrows, to the second group of detector chambers 2742; and light from the first emitter group can travel a longer path, as indicated by the longer arrows, to the third group of detector chambers 2738. The reverse is true for light from the second emitter group, which can travel a shorter path to the third group of detector chambers 2738, and an intermediate path to the second group of detector chambers 2742, and a longer path to the first group of detector chambers 2740.

As described herein, the different emitters can be run independently and/or simultaneously. For example, the emitters can be selectively activated (e.g., modulated) so that only one emitter (or subset of emitters) is emitting light at a given time. For example, in embodiments wherein the first emitter group comprises four emitters, each of the four emitters of the first emitter group may be activated for a quarter cycle (e.g., a different quarter cycle than the other emitters) and off for the remaining three-quarters cycle. For example, a first emitter of the first emitter group may be activated to emit light during only a first quarter cycle, a second emitter of the first emitter group may be activated to emit light during only a second quarter cycle, a third emitter of the first emitter group may be activated to emit light during only a third quarter cycle and a fourth emitter of the first emitter group may be activated to emit light during only a fourth quarter cycle. The emitters of the second emitter group may operate in a similar manner as described.

As another example, in embodiments wherein the first emitter group comprises four emitters, each of the four emitters of the first emitter group may be activated for an eighth of a cycle (e.g., a different eighth of the cycle than the other emitters) and off for the remaining seven-eighths cycle. An eighth of a cycle wherein no emitter is activated may occur between each of the cycles wherein an emitter is activated. For example, a first emitter of the first emitter group may be activated to emit light during only a first quarter cycle, a second emitter of the first emitter group may be activated to emit light during only a third quarter cycle, a third emitter of the first emitter group may be activated to emit light during only a fifth quarter cycle and a fourth emitter of the first emitter group may be activated to emit light during only a seventh quarter cycle. The emitters of the second emitter group may operate in a similar manner as described.

The above examples are not meant to be limiting. Alternative activation sequences for the emitters may be used to provide a time-multiplexed signal. In some embodiments, the emitters can be selectively activated (e.g., modulated) so that two or more emitters are emitting light at a given time (e.g., during the same cycle or during overlapping cycles), for example in a manner similar to the examples given above.

The emitters may be modulated within an emitter group (e.g., first emitter group and second emitter group) or all of the emitters of the wearable device 10 may be modulated according to a single activation sequence. For example, the emitters of the first group may be modulated according to one activation sequence and the emitters of the second group may be modulated according to a second activation sequence. Alternatively, the emitters of the first and second emitters groups can all be modulated according to a single activation sequence.

In some embodiments, the detectors may operate independently from and/or simultaneously with each of the other detectors. For example, each of the detectors may provide an individual signal to the module processor 108.

Signals outputted by the different detectors of the different detector chambers 2740, 2742, 2738 based on light emitted from the first emitter group and/or the second emitter group can provide different information due to the different light paths, which can travel through different areas of the tissue. The longer path penetrates deeper into the tissue and through a greater volume of the tissue to reach the detectors of the "far" group of detector chambers than the intermediate and shorter paths. The shorter path penetrates less deep into the tissue and travels through a smaller volume of tissue to reach the detectors of the "near" group of detector chambers than the intermediate and longer paths. The different information can be separated and/or combined to calculate a plurality of physiological parameters of the wearer of the sensor or module 2700, for example, an indication of the wearer's hydration status, which will be described in greater detail below.

For convenience, the terms "proximal" and "distal" are used herein to describe structures relative to the first emitter group or the second emitter group. For example, a detector may be proximal or distal to the first emitter group and may be proximal or distal to the second emitter group. The term "distal" refers to one or more detectors that are farther away from an emitter group than at least some of the other detectors. The term "proximal" refers to one or more detectors that are closer to an emitter group than at least some of the other detectors. The term "intermediate detector" refers to detectors that are closer to an emitter group than distal detectors and farther from an emitter group than proximal detectors. The term "proximal detector" may be used interchangeably with "near detector" and the term "distal detector" may be used interchangeably with "far detector".

A single detector may be both a proximal to one emitter and distal to another emitter. For example, a detector may be a proximal detector relative to the first emitter group and may be a distal detector relative to the second emitter group.

Figure 4C:
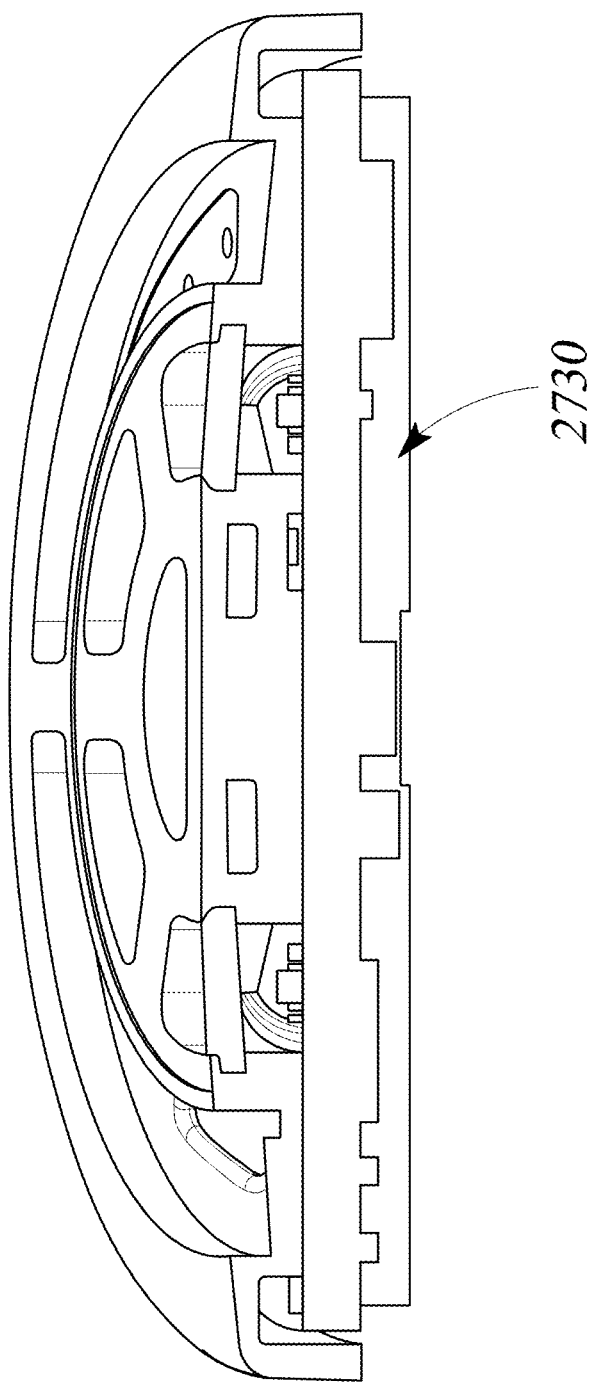
FIG. 4C illustrates a longitudinal cross-sectional view of an example physiological parameter measurement sensor or module.
Figure 4D:
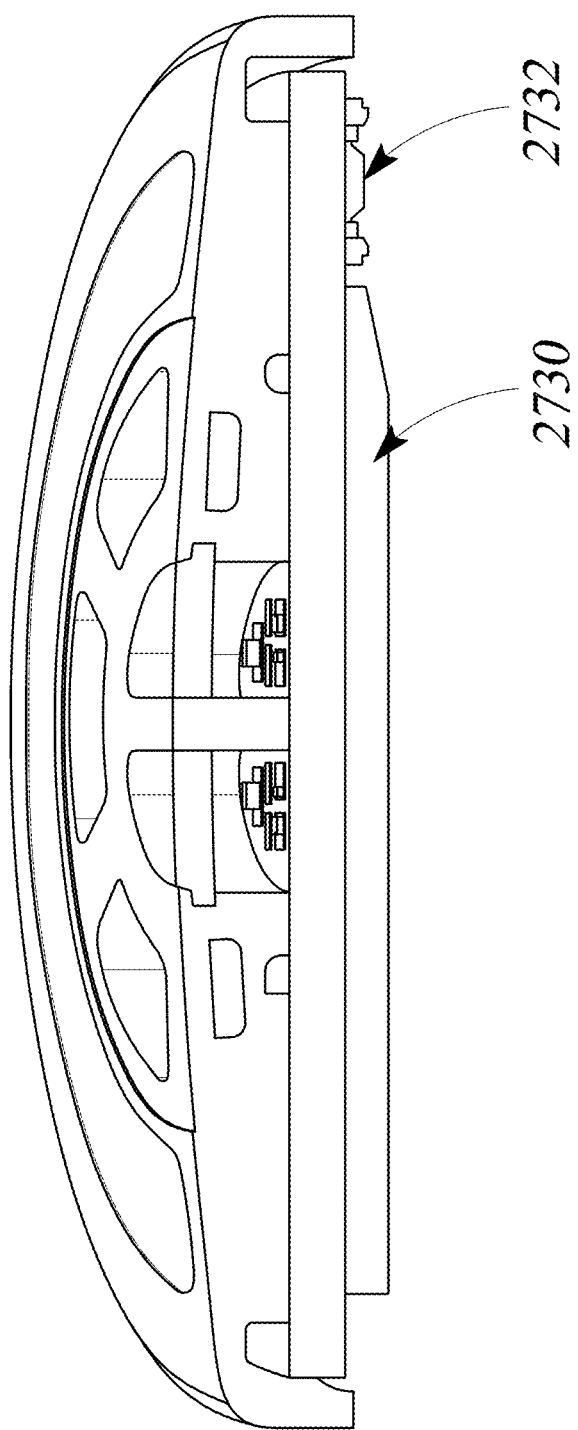
FIG. 4D illustrates a longitudinal cross-sectional, that is orthogonal to the view of FIG. 4C, of an example physiological parameter measurement sensor or module.

As shown in FIGS. 4C and 4D, on the second side of the PCB 2716, which faces away from the cover, the PCB 2716 can be covered by melt plastic or other suitable electronics protective material 2730 (similar to the protective material 130 disclosed herein) except that a flex connector 2732 can remain exposed. The flex connector 2732 can be configured to connect the module 2700 electrically to the wearable device incorporating the module 2700.

Example Pulse Oximetry Environment

Figure 7:
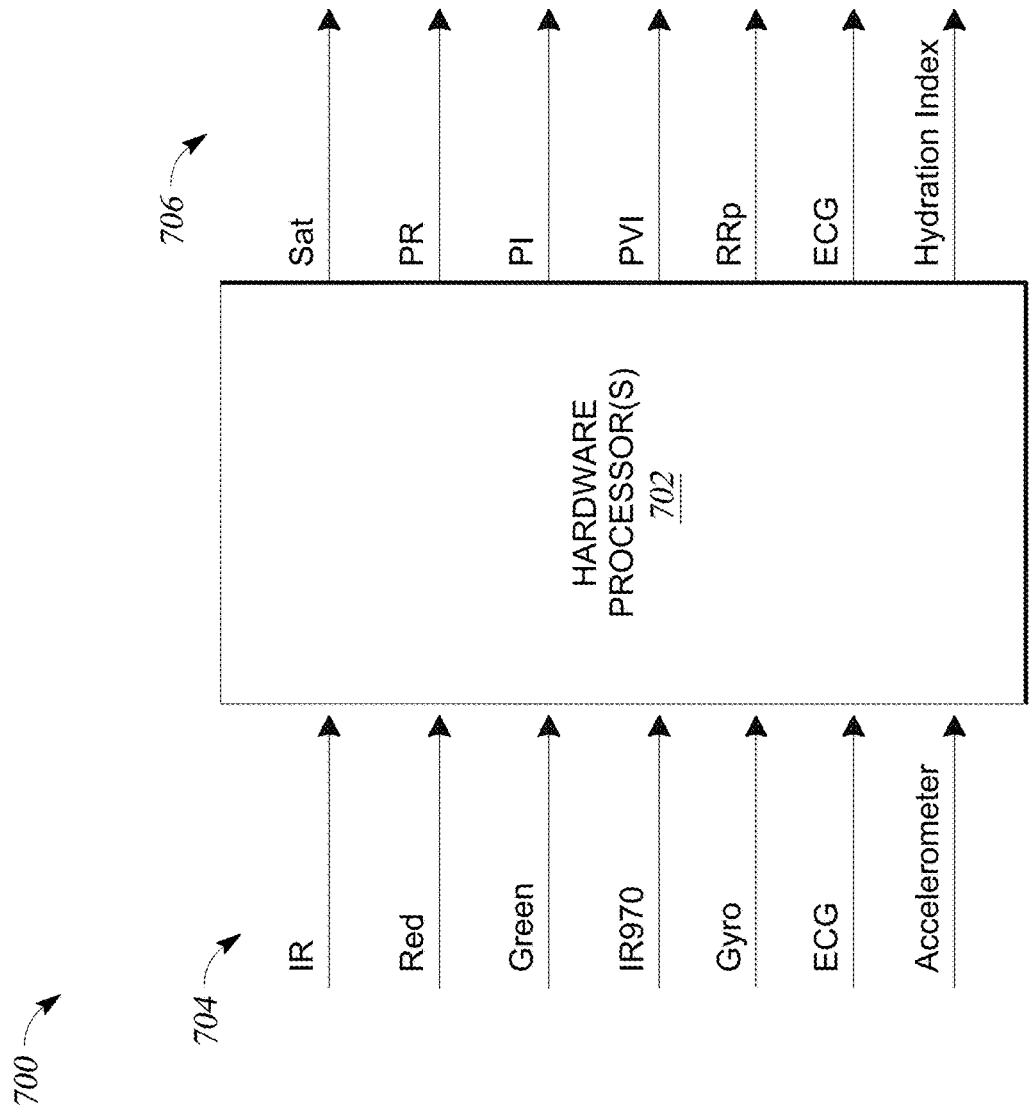
FIG. 7 shows a block diagram of an example sensor device, such as a wearable device.

FIG. 7 shows a block diagram 700 of an example sensor device, such as a wearable device. In some examples, the wearable device may include a smart watch. As illustrated in FIG. 7, one or more hardware processors 702 of a wearable device may be configured to process one or more input signals 704. The one or more input signals may include but are not limited to one or more signals from one or more sensors, such as optical sensors, motion based sensors, or other types of sensors. The one or more hardware processors 702 may be configured to process one or more wavelengths of a plurality of emitted wavelengths. In some examples, the system may include at least a first, second, third, and fourth wavelength. In some examples, the system may use fewer than or more than four wavelengths. For example, a first wavelength may include an infrared wavelength, a second wavelength may include a red wavelength, a third wavelength may include a green wavelength, and a fourth wavelength may include an infrared wavelength greater than the first wavelength. The one or more hardware processors 702 may be configured to process one or more infrared signals (for example, one or more optical signals at approximately 905 nm or 970 nm, range 800-1,000 nm), red signals (for example, one or more optical signal at approximately 620 nm or 660 nm, range, 600-800 nm,), green signals (for example, one or more optical signal at approximately 525 nm, range, 500-600 nm). Additionally or alternatively, the one or more hardware processers 702 may be configured to processes one or more gyroscope signals, accelerometer signals, or other motion based sensor signals. Additionally or alternatively, the one or more hardware processors 702 may be configured to process an ECG signal or other sensor signal.

In some examples, the one or more hardware processors 702 may be configured to output an output value 706, which may include, but is not limited to one or more physiological parameters or processed signals. In some examples, one or more physiological parameters may include one or more of an $SpO_2$ value, pulse rate (PR), perfusion index (PI), pulse variability index (PVI), respiration rate (RRp), ECG, and hydration index.

Figure 8A:
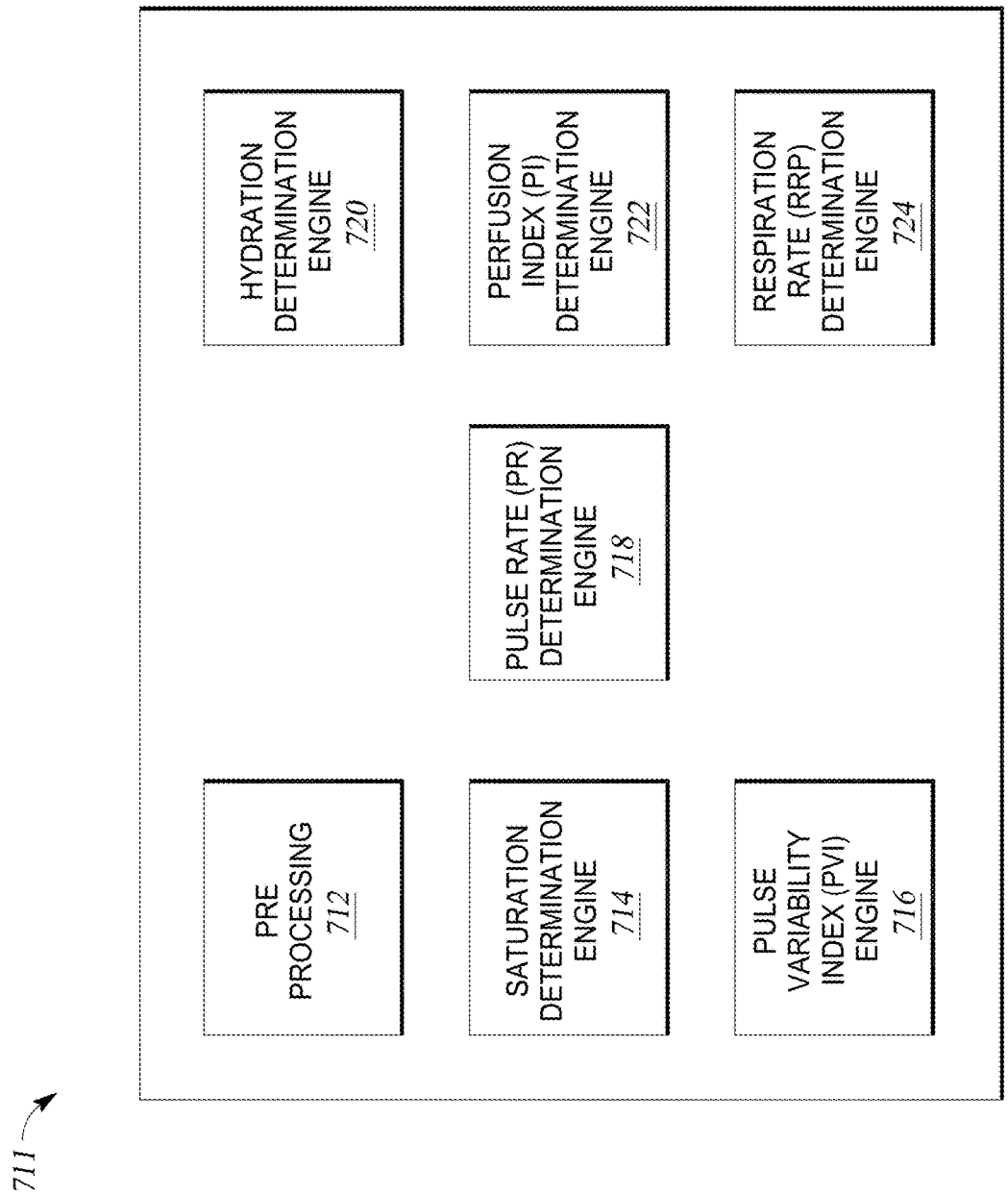
FIG. 8A illustrates an example controller that may be configured to processes one or more input values to produce the one or more outputs, such as a blood oxygen saturation and a pulse rate.

FIG. 8A illustrates an example controller 711 that may be configured to processes the one or more input values 704 to produce the one or more outputs 706. In some examples, the controller 711 may include the one or more hardware processors 702, such as described with reference to FIG. 7. In some examples, a controller 711 may include a pre-processing engine 712, saturation determination engine 714, pulse variability index (PVI) engine 716, pulse rate (PR) determination engine 718, hydration determination engine 720, perfusion index (PI) determination engine 722, and/or a respiration rate (RRp) determination engine 724.

A pre-processing engine 712 can include one or more processes for analyzing, cleansing, editing, reducing, wrangling, or otherwise processing data, such as the one or more input signals 704 for further processing or analysis by one or more engines of the controller 711. In some examples, a pre-processing engine 712 may include one or more processes for cleaning up data using an interpolative process.

Figure 8B:
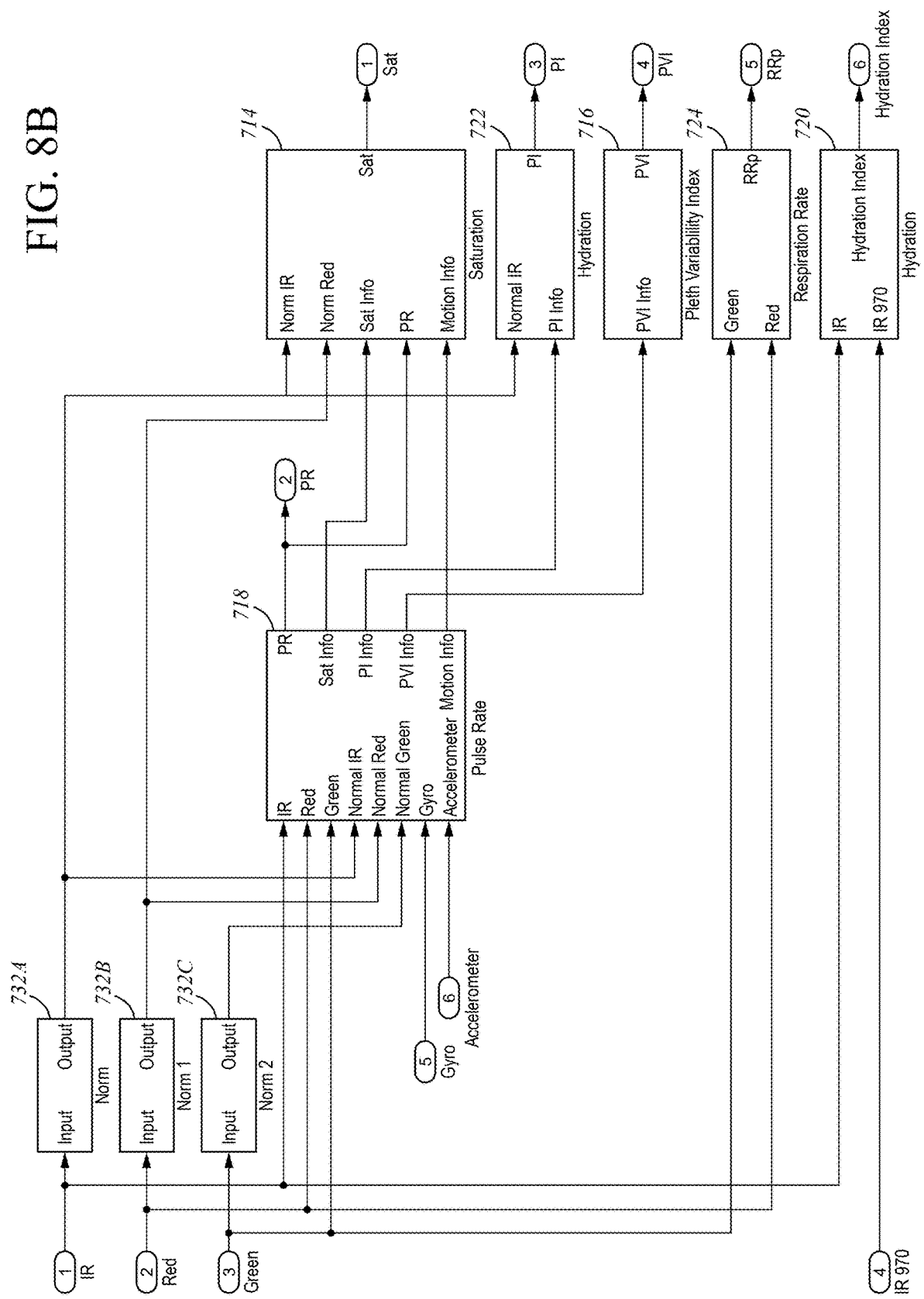
FIG. 8B illustrates an example of how one or more engines of a controller may interact to produce one or more outputs.

FIG. 8B illustrates example data processing 703 and shows an example of how one or more engines of a controller 711 may interact to produce one or more outputs 706, such as illustrated in FIG. 7. In the illustrated example, one or more optical signals may be normalized or otherwise processed. For example, a controller 711 may normalize an IR signal at a block 732A to produce a normalized IR signal. In another example, a controller 711 may normalize a red signal at a block 732B to produce a normalized Red signal. In another example, a controller 711 may normalize a green signal at a block 732C to produce a normalized green signal. In another example, a controller 711 may normalize an IR970 signal (not shown) to produce a normalized IR970 signal. In some examples, a controller 711 may perform other processing or pre-processing on one or more of the input signals 704. In some examples, a controller 711 may normalize a signal by taking a log of the signal. Other types of data transformation may also be used.

In some examples, a controller 711 may determine a pulse rate using a pulse rate engine 718 using some combination of one or more input signals 704 and/or processed input signals, such as a normalized IR, normalized red, or normalized green signal. In some examples, a pulse rate determination engine 718 may process an IR signal, red signal, green signal, normalized IR signal, normalized red signal, normalized green signal, gyroscope signal, accelerometer signal or other input. In some examples, the pulse rate determination engine 718 may output a pulse rate value, blood oxygen saturation ($SpO_2$) information, perfusion index (PI) information, pulse variability index (PVI) information, motion information, one or more confidence values associated with the output, or other output.

In some examples, a controller 711 may determine an $SpO_2$ value using a saturation engine 714 using some combination of one or more input signals 704, processed input signals, and/or information from another engine of the controller 711. In some examples, a saturation engine 714 may process a normalized IR signal, a normalized red signal, pulse rate, saturation information (determined, for example, using a pulse rate determination engine), motion information (determined, for example, using a pulse rate determination engine), or other input. In some examples, the saturation engine 714 may output a saturation or $SpO_2$ value, a confidence value associated with the output value or other output. In some examples, saturation information may include some combination of frequency domain and/or time domain data associated with one or more input signals. In some examples, motion information may include information associated with motion of the user or device, including but not limited to motion features, type of motion (for example, periodic, random), motion rate, magnitude of a gyroscope signal, magnitude of an accelerometer signal, maximum acceleration, or other motion related information.

In some examples, a controller 711 may determine a perfusion index (PI) using a perfusion index engine 722 using some combination of one or more input signals 704, processed input signals, and/or information from another engine of the controller 711. In some examples, a perfusion index engine 722 may process a normalized IR signal and PI information (determined, for example, using a pulse rate determination engine 718). In some examples, the perfusion index engine 722 may output a perfusion index (PI) or PI related value, confidence value, or other output.

In some examples, a controller 711 may determine a pleth variability index (PVI) using a pleth variability index (PVI) engine 716 using some combination of one or more input signals 704, processed input signals, and/or information from another engine of the controller 711. In some examples, a PVI engine 716 may process pleth variability index (PVI) information (determine, for example, using a pulse rate determination engine 718). In some examples, a PVI engine may output a PVI or PVI related value, confidence value, or other output.

In some examples, a controller 711 may determine a respiration rate value (such as RRp) using a respiration rate engine 724 using some combination of one or more input signals 704, processed input signals, and/or information from another engine of the controller 711. In some examples, a respiration rate engine 724 may process a green signal and a red signal. In some examples, a respiration rate engine 724 may output a respiration rate or respiration rate related value, confidence value, or other output.

In some examples, a controller 711 may determine a hydration index using a hydration engine 720 using some combination of one or more input signals 704, processed input signals, and/or information from another engine of the controller 711. In some examples, a hydration engine 720 may process an infrared signal and an IR970 (for example, a signal at approximately 970 nm). In some examples, a hydration engine 720 may output a hydration index or hydration related value, confidence value, or other output.

Figure 8C:
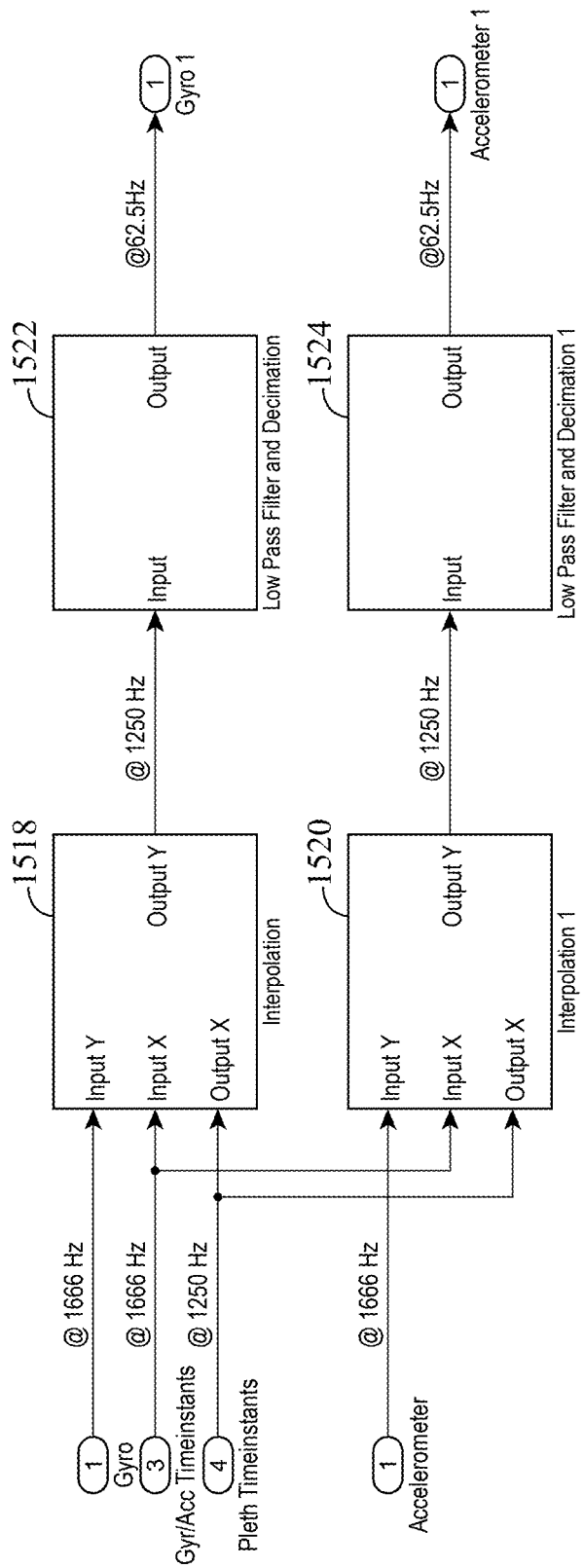
FIG. 8C illustrates an example schematic input and output flow diagram of the gyroscope and accelerometer of a physiological parameter measurement module disclosed herein.

FIG. 8C illustrates example processing of the raw signals from the accelerometer and the gyroscope to output the gyroscope and accelerometer signals. The sensor or module processor can combine each of the raw gyroscope and accelerometer signals (which can be raw signals from any axis of the gyroscope and/or accelerometer) with gyroscope/accelerometer time instants and pleth time instants signals in an interpolation module 1518 or interpolation 1 module 1520 respectively. The sensor or module processor can further process the outputs from the interpolation module 1518 or interpolation 1 module 1520 in a low pass filter and decimation module 1522 or low pass filter and decimation 1 module 1524 respectively to output a gyro1 signal and an accelerometer 1 signal. The output gyre 1 and accelerometer 1 signals can be sent to the ASIC described above.

Figure 8D:
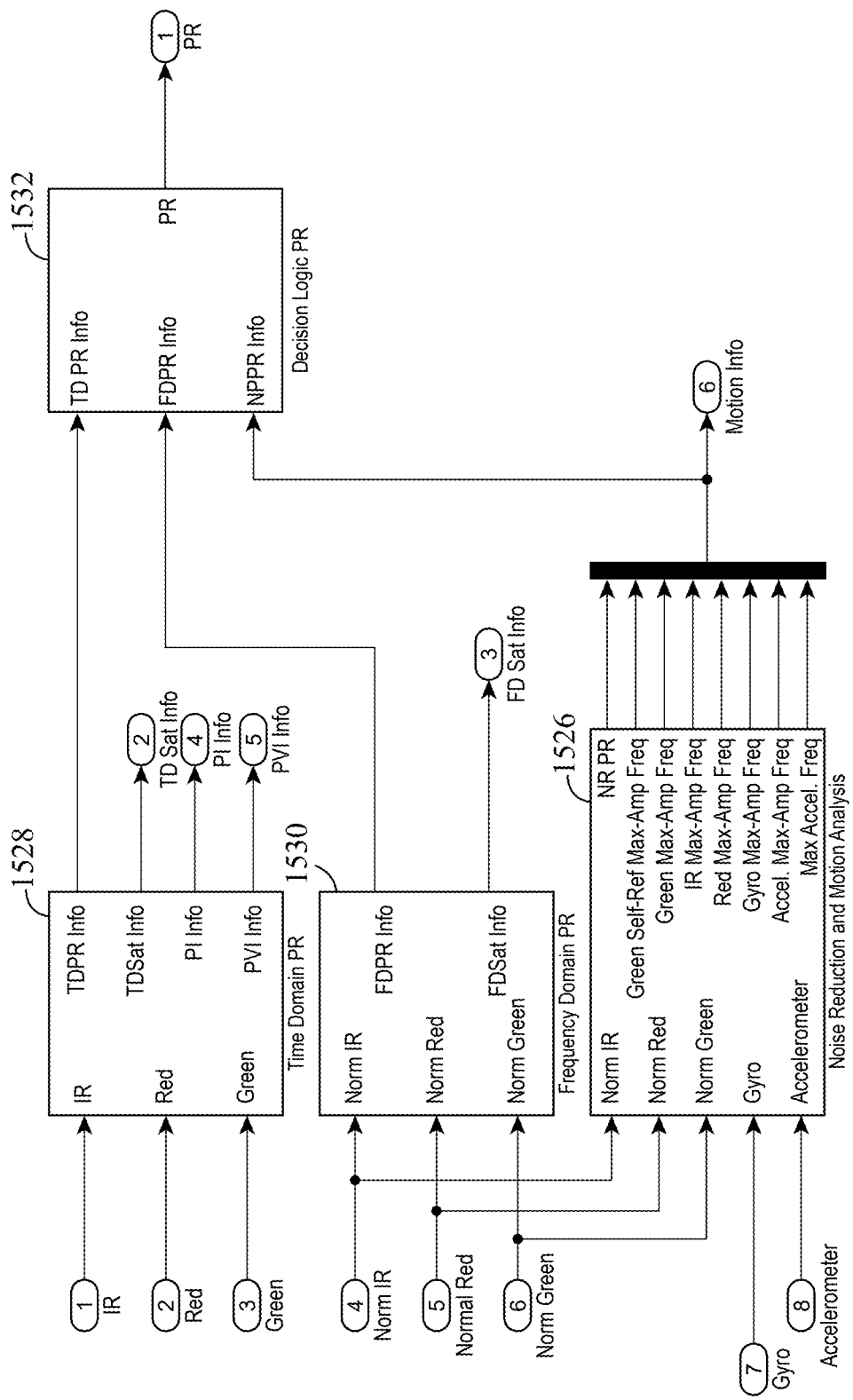
FIG. 8D illustrates an example schematic block diagram for determining pulse rate using a physiological parameter measurement module disclosed herein.

As shown in FIG. 8D, the sensor or module processor can extract motion information from the gyroscope and accelerometer input and the normalized signals of the first, second, and third wavelengths in an interference mitigation (IM) and motion analysis module 1526. As also shown in FIG. 8D, the sensor or module processor can obtain time domain pulse rate (TDPR) information, TD saturation information, PI information, and PVI information in a time domain pulse rate determination module 1528 from the intensity signals of the first, second, and third wavelengths. The sensor or module processor can obtain frequency domain pulse rate (FDPR) information and FD saturation information in a frequency domain pulse rate determination module 1530 based on normalized signals of the first, second, and third wavelengths. The sensor or module processor can determine and output a pulse rate in a pulse rate decision logic 1532 based on the TDPR information, FDPR information, interference mitigation (IM) PR information (output by the interference mitigation and motion analysis module 1526), and motion information.

Figure 8E:
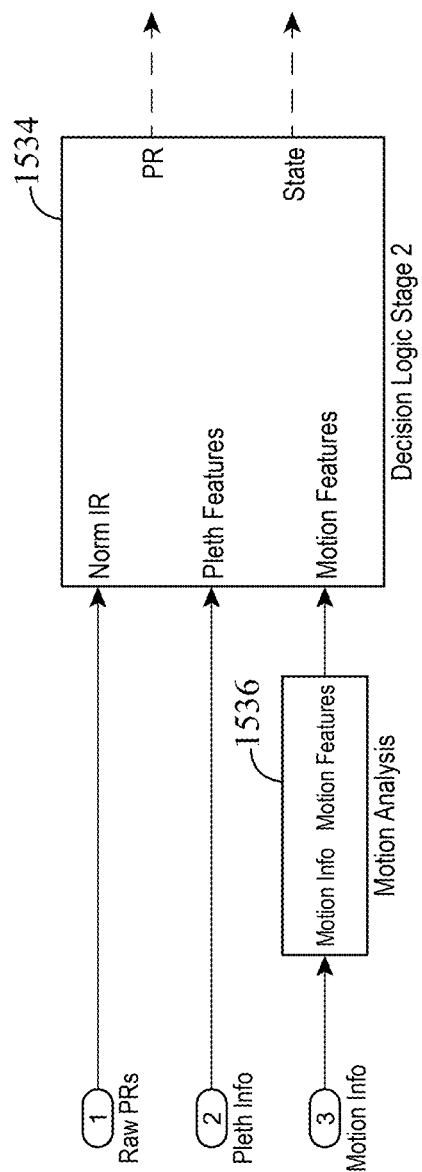
FIG. 8E illustrates an example decision logic for determining pulse rate using a physiological parameter measurement module disclosed herein.

FIG. 8E illustrates an example pulse rate determination decision logic. In this example, a decision logic stage 2 module 1534 can receive as input raw pulse rate calculations from individual pulse rate determination engines (for example, the time domain pulse rate determination module 1528, the frequency domain pulse rate determination module 1530 and the interference mitigation and motion analysis module 1526 as shown in FIG. 8D), pleth features including time domain and frequency domains from N channels (for example, N=4 or more) of pleth signals, and motion features obtained from a motion analysis module 1536. The motion analysis module 1536 can assess the amount of motion, define the type of motion, and calculate a motion rate (for example, per minute) if the motion is determined to be periodic, and/or the like based on motion information from a 6DOF (degree-of-freedom) inertia measurement unit (IMU). The IMU can include the accelerometer and the gyroscope on the physiological parameter measurement module.

Figure 8F:
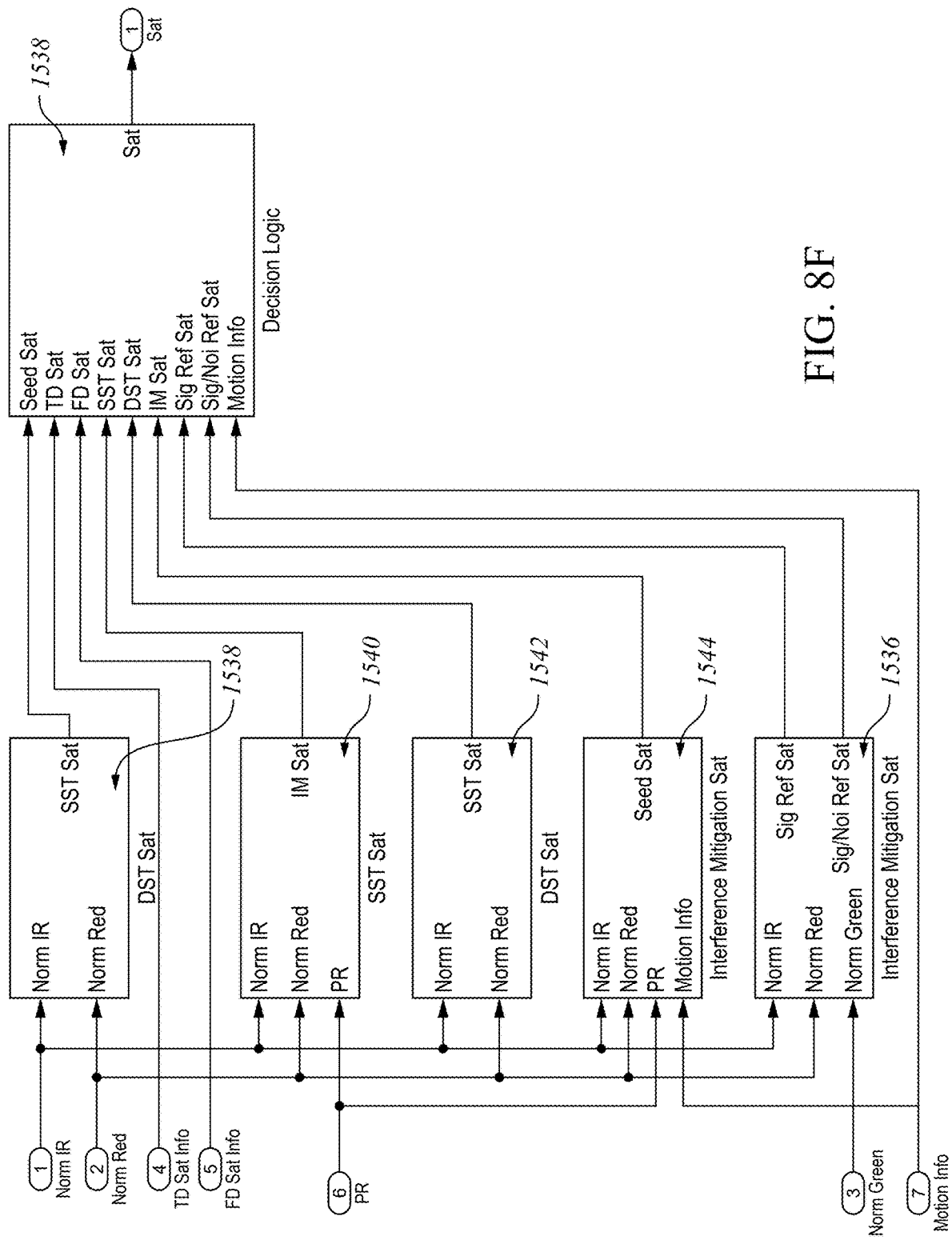
FIG. 8F illustrates an example schematic input and output flow diagram for determining oxygen saturation using a physiological parameter measurement module disclosed herein.

FIG. 8F illustrates an oxygen saturation determination module including a plurality of parallel signal processing engines, such as a Seed saturation module 1538, an SST saturation module 1540, a DST saturation module 1542, an interference mitigation (IM) saturation module 1544, and a signal/noise reference saturation module 1546, configured to feed individual raw oxygen saturation ($SpO_2$) values to a decision logic 1548. The decision logic 1548 can further receive as input the motion information and output a final oxygen saturation measurement based on the motion information and the raw oxygen saturation values determined by the parallel engines.

Figure 8G:
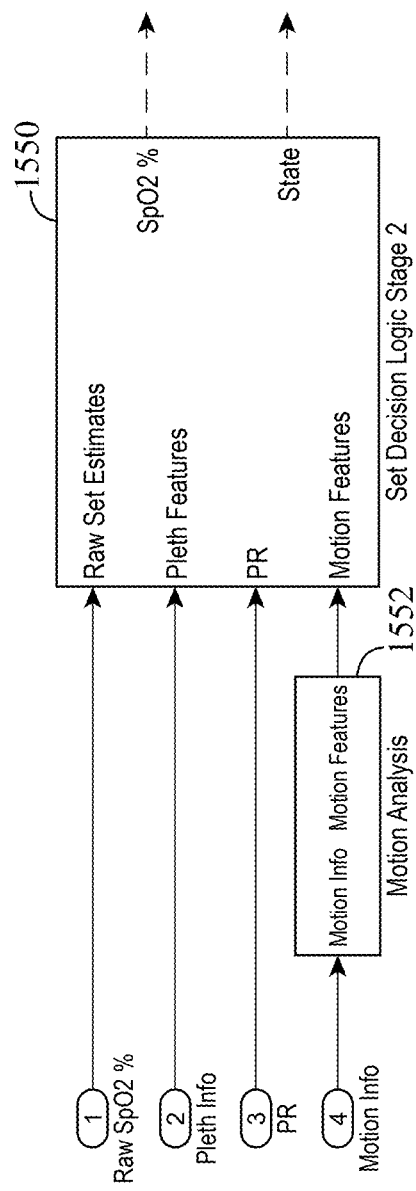
FIG. 8G illustrates an example decision logic for determining oxygen saturation using a physiological parameter measurement module disclosed herein.

FIG. 8G illustrates an example oxygen saturation determination decision logic. In this example, a saturation decision logic stage 2 module 1550 can receive as input raw oxygen saturation calculations from the parallel engines described above, pleth features, pulse rate, and motion features obtained from a motion analysis module 1552. The pleth features received by the module 1550 can include the features in the pulse rate decision logic shown in FIG. 8E. Additionally, the pleth features received by the module 1550 can include features related to saturation, for example, the DC ratio of the second and third wavelengths.

With continued reference to FIG. 8B, the sensor or module processor can determine the PI measurement based on the normalized signal of the third wavelength and the PI information in a perfusion index determination module 1510. The sensor or module processor can determine the PVI measurement based on the PVI information in a pleth variability index determination module 1512. The sensor or module processor can determine the RRp measurement based on the intensity signals of the first and second wavelength in a respiration rate determination module 1514. The sensor or module processor can determine the hydration index in a hydration determination module 1516 based on the intensity signals (for example, from the "far detectors" disclosed herein) of the fourth wavelength, which is more sensitive to changes in water in the measurement site and another wavelength (for example, the third wavelength or about 905 nm) that is less sensitive to changes in water. The sensor or module processor can focus on the DC component of the signals for hydration status monitoring.

Attenuation Parameters

Disclosed herein are systems and methods for using diffuse reflectance or other spectroscopy techniques to estimate tissue optical properties (generally referred to as attenuation parameters). A wearable device 10 can include one or more emitters that emit light into the tissue, and can further include multiple spatially separated detectors that collect diffuse reflectance remitted from the tissue surface and generate signals responsive to the detected light. Using the signals generated by the detectors, the wearable device 10 can estimate a value for one or more attenuation parameters. For example, as described herein, the wearable device 10 can determine an effective attenuation coefficient ($\mu_{eff}$), a reduced total interaction coefficient ($\mu_t'$), an absorption coefficient ($\mu a$), a reduced scattering coefficient ($\mu s'$), or a refractive index ($n_{TISSUE}$) based on expected relationships between diffused light, distance of the detectors from the emitter, and/or the attenuation parameters.

In some cases, based on an estimated value of the attenuation parameter, the wearable device 10 can calculate an improved estimate of a physiological parameter. For example, the estimated value of an attenuation parameter (for example, $\mu_{eff}$) can be used to correct for differences between noninvasive pulse oximetry ($SpO_2$) and a direct measurement of blood gas ($SaO_2$) (generally referred to as the $SpO_2$-$SaO_2$ bias). In general, the lower the $SpO_2$-$SaO_2$ bias, the more accurate the measurement.

Figure 9A:
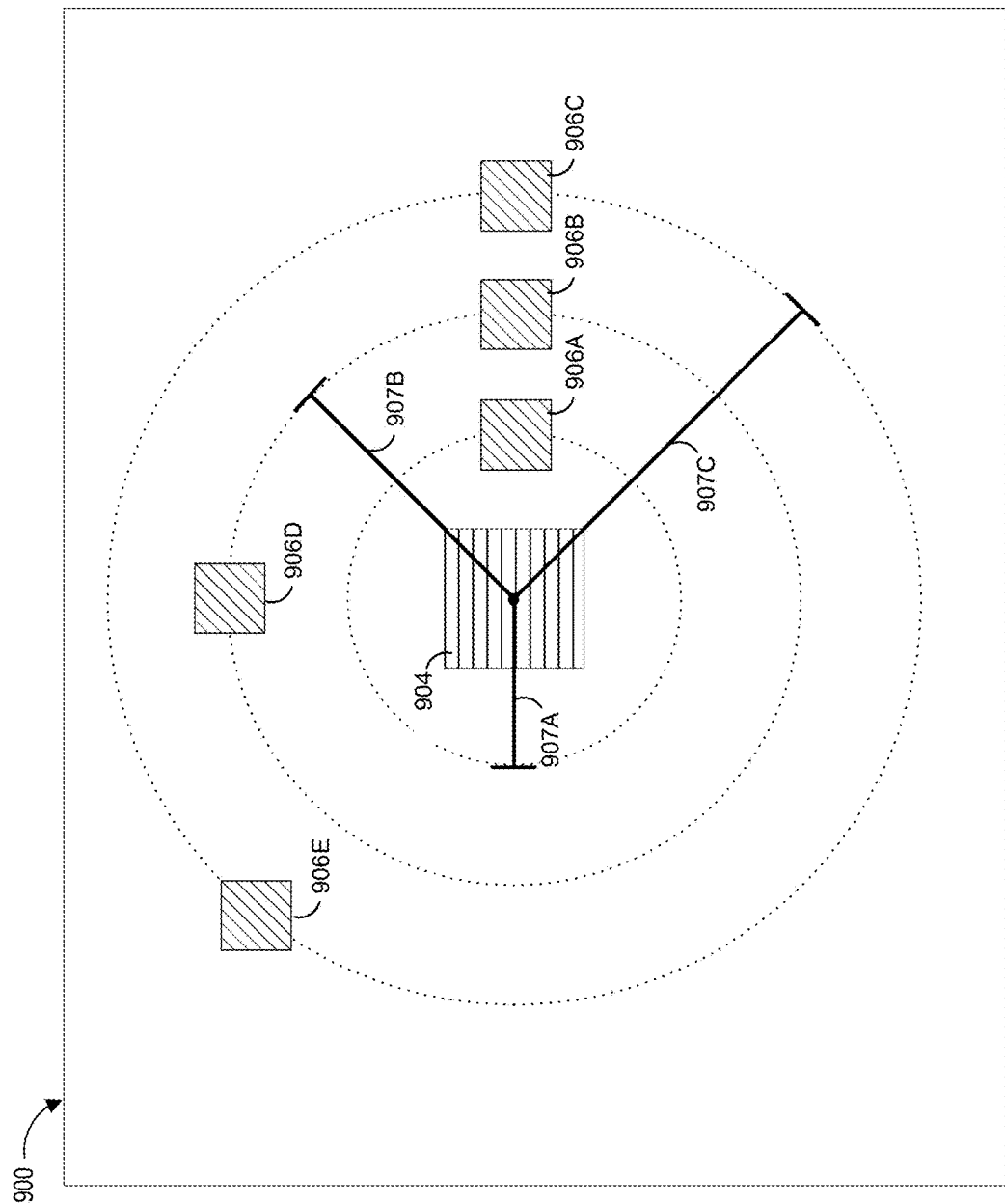
FIG. 9A illustrates an example spatial configuration of an emitter and a plurality of detectors of an example physiological monitoring device.

FIG. 9A illustrates an example spatial configuration of an emitter 904 and a plurality of detectors 906A, 906B, 906C, 906D, 906E (individually or collectively referred to as detector 906 or detectors 906) of a physiological monitoring device 900. The physiological monitoring device 900 can be an embodiment of, or include one or more features or components of, of the wearable device 10. It will be appreciated that the layout shown in FIG. 9A represents an example spatial configuration and other examples may use fewer, additional, or different components or arrangements.

Each of the detectors 906 can be spatially separated from each other. Furthermore, each of the detectors 906 can be spatially separated from the emitter 904. For instance, in the illustrated example of FIG. 9A, the detector 906A is a first distance 907A from the emitter 904, the detectors 906B and 906D are a second distance 907B from the emitter 904, and the detectors 906C and 906E are a third distance 907C from the emitter 904. In some cases, some or all of the detectors 906 are the same distance from emitter 904. For example, similar to the detectors 906B and 906D, some or all of the detectors 906 can be located the same distance away from the emitter 904, but offset at different radial angles relative to the emitter 904. As another example, similar to the detectors 906A, 906B, and 906C, some or all of the detectors 906 can be linearly aligned with each other and/or with the emitter 904. Further still, similar to the detectors 906E and 906A, some or all of the detectors 906 can be located at different distances away from the emitter 904 and offset at different radial angles at different radial angles.

The spatial separation between the detectors 906 and/or the emitter 904 can enable the detectors 906 to measure light intensity at two or more radial distances from the emitter 904 and/or an illuminated tissue site. In some such cases, using the signals from these detectors, the physiological monitoring device 900 can determine one or more values of an attenuation parameter.

SpO$_2$ measurements at the wrist typically rely on diffuse reflectance of complex tissue, rather than transmission which is used on the more homogenous tissue qualities of the fingertip capillaries. As compared to a finger, the skin at the wrist consists of shallow capillaries and deeper vessels. As the optically observable perfusion of the capillary bed may be weak compared to deeper venous pulsations (which may be significantly augmented by movement), the DC trend may allow for interpolation of SpO$_2$ during motion periods excessive motion.

Figure 9B:
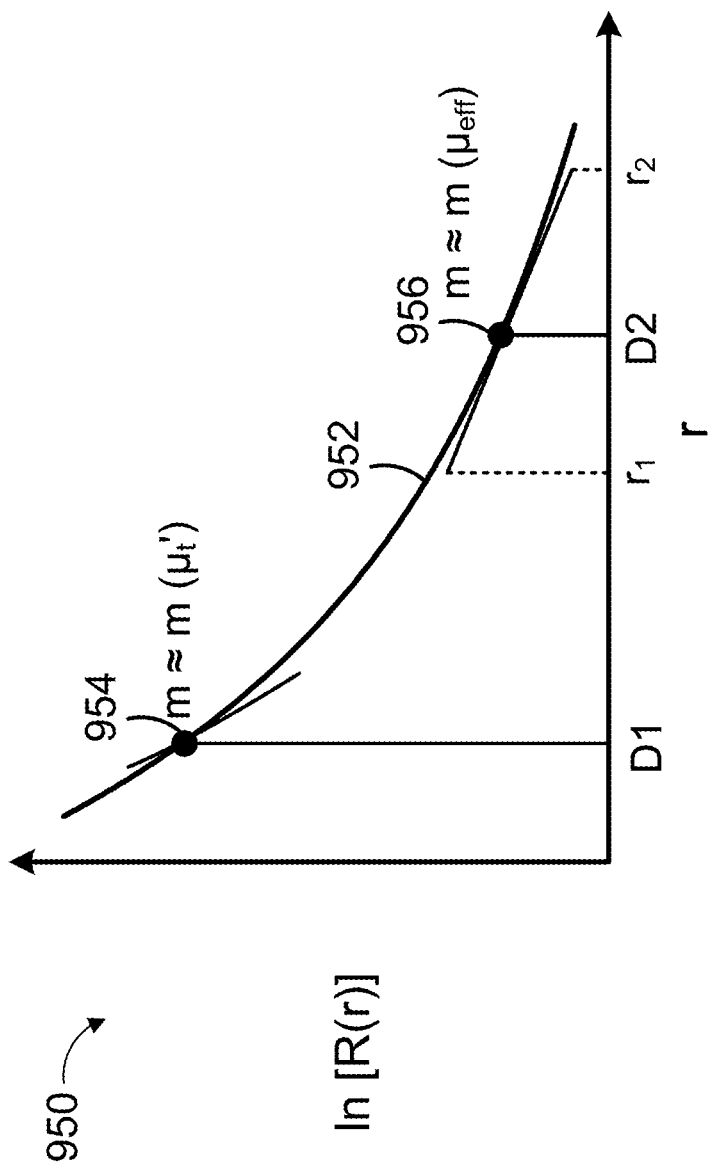
FIG. 9B is a graph illustrating a relationship between various attenuation parameters and a spatial variation of detectors.

FIG. 9B is a graph 950 illustrating a relationship between various attenuation parameters and a spatial variation of detectors, such as the detectors of 906 of FIG. 9A. The x-axis on the graph 950 corresponds to a radial distance, r, of the detectors from the measurement site, where $r_1$ corresponds to the radial distance of a first detector from the measurement site, and $r_2$ corresponds to the radial distance of a second detector from the measurement site. The y-axis on the graph 900 corresponds to ln[R(r)], which is the natural logarithm of reflectance, R, at radial distance, r, which can be expressed as R(r). R(r) is a value of the light intensity as a function of the distance, $r_1$ and $r_2$, of the detectors from the measurement site. Consider a scenario in which a wearable device 10 includes at least one emitter, a first detector, and a second detector. The at least one emitter emits light of a first wavelength into a body part of a wearer of the wearable device 10. Each of the first and second detectors, at their respective radial distance from the measurement site, receives the light after the light interacts with the body part, and generates a first set of signals and second set of signals, respectively, based on the light corresponding to the first wavelength. In such a scenario, the slope of log(R(r)) can estimate the effective absorption for a given wavelength and be defined by the following relationship:

$$\mu_{eff} \approx \frac{d}{dr}(\ln(R(r))) = \frac{\ln(R(D_1)) - \ln(R(D_2))}{D_1 - D_2} \quad \text{(Equation 1)}$$

where $\mu_{eff}$ is the effective attenuation which is proportional to the log of the reflectance as measured at two distances, $r_1$ and $r_2$, and ln[R(r)] is the natural logarithm of R(r). In some cases, the effective attenuation is wavelength dependent and may be calculated for individual emission sources.

The graph 950 illustrates a curve 952 corresponding to ln[R(r)]. As shown, in some cases, the slope of the ln[R(r)] curve 952 can be correlated to various attenuation parameters. For example, when the distance, r, is approximately equal to D1, the slope of the ln[R(r)] curve 952 (also referred to as the ln[R(r)] derivative) can be strongly correlated with a reduced total interaction coefficient, $\mu_t'$. Furthermore, when the distance, r, is approximately equal to D2, the slope of the ln[R(r)] curve 952 can be strongly correlated with an effective attenuation coefficient $\mu_{eff}$. D1 and D2 can vary across embodiments. In some cases, D1 is a relatively small distance and D2 is a relatively large distance.

As shown by FIG. 9B, in some cases, a correspondence exists between slopes of ln[R(r)] measured at various distances, r, and the relevant attenuation parameters. Accordingly, in some cases, values of one or more attenuation parameters can be estimated based at least in part on the spatial variation of detectors and a reflected intensity, R(r). Estimating one or more attenuation parameters in this way can aid in the correction of physiological parameter (e.g., SpO$_2$) bias across subjects. For example, the estimations can correct DC values by shifting the calibration curve, which can reduce error. Attenuation coefficient estimates calculated for individual wavelengths can be compared against multiple tissue paths in order to determine which candidate may have minimal venous contamination.

In some cases, for example in lieu of a second radial detection source, the wearable device 10 may pre-calibrate individual detectors or sets of detectors off-patient (for example, using a tissue phantom with fixed effective absorption coefficients). In some such cases, these reference reflectance values can be captured and stored. Furthermore, relative reflectance values per wavelength and detector can be calculated by dividing patient readings with reference readings. These wavelength-specific features can be used in classifying tissue paths (for example, as venous contaminated or non-venous contaminated) and be used to improve an accuracy of a physiological measurement, such as SpO$_2$.

Flow Diagram

In light of the description herein, it will be understood that the embodiments disclosed herein substantially improve wrist-based or other pulse oximetry and pulse oximetry in the presence of motion. Specifically, the embodiments disclosed herein enable a wearable device to use light intensity measured at two or more radial distances to estimate attenuation parameter values that can be used to correct physiological parameter (for example, SpO$_2$) bias across subjects. The ability to estimate attenuation parameter values using a non-invasive sensor of the wearable device advantageously increases the accuracy, usability, and reliability of the wrist-based or other pulse oximetry of the wearable device. By using the estimated attenuation parameter values to correct bias across subjects, the wearable device advantageously improves results of any wrist-based pulse oximetry performed by the device.

Figure 10:
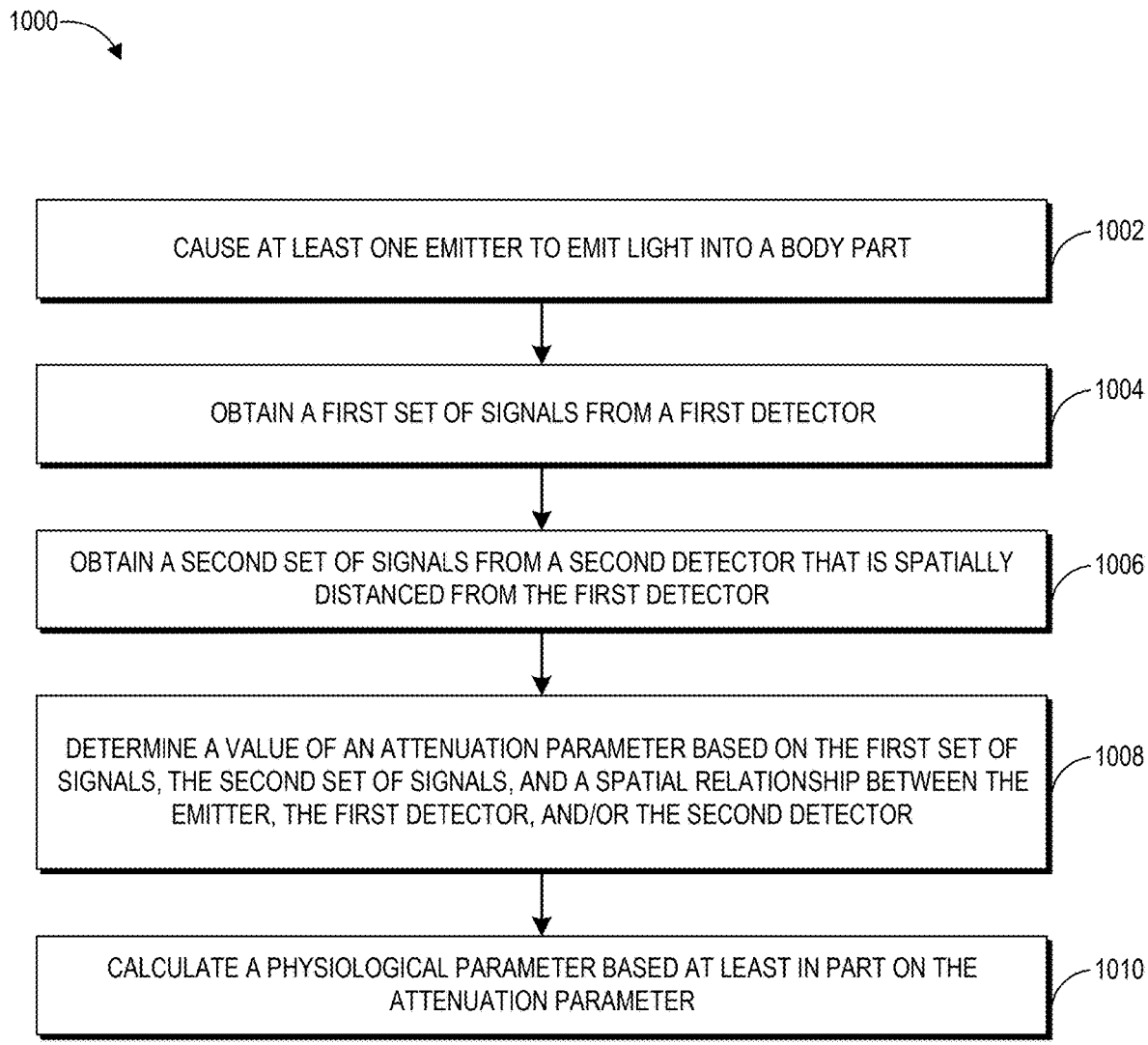
FIG. 10 is a flow diagram illustrative of an embodiment of a routine for calibrating a physiological monitoring device.

FIG. 10 is a flow diagram illustrative of an embodiment of a routine 1000, implemented by a wearable device 10, for determining values of attenuation parameter values associated with tissue of an individual. Routine 1000 may be part of a calibration or other process. Furthermore, although described as being implemented by the wearable device 10, it will be understood that the elements outlined for routine 1000 can be implemented by any computing device that is associated with the wearable device 10, such as, but not limited to, the device processor 14 or the plethysmography module 100. Thus, the following illustrative embodiment should not be construed as limiting.

At block 1002, the wearable device 10 causes at least one emitter to emit light into a body part of the wearer. The particular wavelength(s) of the light can vary across embodiments. For example, the light can include one or more wavelengths that have a green color (for example, with a wavelength of 495-570 nm), a yellow color (for example, with a wavelength of 570-590 nm), an orange color (for example, with a wavelength of 590-620 nm), or a red color (for example, with a wavelength of 620-750 nm). As another example, the light can include infrared wavelength (for example, with a wavelength of 700 nm-1 mm).

In some cases, light includes a first wavelength and a second wavelength, where the first wavelength is shorter than the second wavelength. For example, the first wavelength can include a wavelength within the range of about 520 nm to about 650 nm, such as about 525 nm or about 620 nm, while the second wavelength can include a wavelength within the range of about 600 nm to about 1050 nm, such as about 620 nm or about 1005 nm. In some cases, the second wavelength can correspond to a reference signal, such as by providing an orange or green color. For example, as described herein, the wearable device 10 can use the second wavelength as a normalizing wavelength when calculating ratios of intensity signals of the other wavelengths.

The body part into which light is emitted can vary across embodiments. For example, the body part can include, but is not limited to, a finger, wrist, a forearm, an upper arm, a toe, an ankle, a calf, an upper leg, a neck, or the like. In some cases, the body part can depend on the location of the wearable device.

At block 1004, the wearable device 10 obtains a first set of signals from a first detector of the wearable device 10 based at least in part on the light interacting with the body part of the wearer. The first set of signals can correspond to an intensity of light detected by the first detectors. For example, the first detector can generate the first set of signals responsive to detecting the light after the light interacts with the body part. In some cases, the first set of signals corresponds to one or more photoplethysomography ("pleth") signals.

At block 1006, similar to block 1004, the wearable device 10 obtains a second set of signals from a second detector of the wearable device 10 based at least in part on the light interacting with the body part of the wearer. The second set of signals can correspond to an intensity of light detected by the second detector. For example, the second detector can generate the second set of signals responsive to detecting the light after the light interacts with the body part. In some cases, the second set of signals corresponds to one or more photoplethysomography ("pleth") signals.

As mentioned herein, the wearable device can include a plurality of detectors, including the first detector and the second detector. The plurality of detectors are spatially separated from each other, thereby allowing each of the detectors to detect light (for example, by collecting diffuse reflectance remitted from the tissue surface) at various radial distances (or angles) from the at least one emitter and/or from the tissue site illuminated by the least one emitter. In some cases, some or all of the detectors can be different distances from the at least one emitter, the tissue site illuminated by the least one emitter, and/or each other. For example, at least two of the detectors can be linearly aligned with the emitter such that the at least two of the detectors are different distances from the emitter. In addition or alternatively, in some cases, at least two of the detectors have different radial angles relative to the emitter. For example, assuming the emitter to be the origin of a circle, a first detector of the detectors can be located at 0 degrees, while a second detector of the detectors can be located at 90 degrees.

At block 1008, the wearable device 10 determines a value of an attenuation parameter based at least in part on the first set of signals, the second set of signals, and a spatial relationship between at least two of the emitter, the first detector, the second detector, or the measurement site. As described herein, the attenuation parameter can be an optical property of the tissue site illuminated by the least one emitter. For example, the attenuation parameter can include, but is not limited to, an effective attenuation coefficient ($\mu_{\mathit{eff}}$), a reduced total interaction coefficient ($\mu_t'$), an absorption coefficient ($\mu a$), a reduced scattering coefficient ($\mu s'$), or a refractive index ($n_{\mathit{TISSUE}}$).

In some cases, to determines the value of the attenuation parameter, the wearable device 10 can consult stored attenuation parameter data. The stored data can include relationships between measurement data (for example, light intensity values), spatial relationship data (for example, relative distances, positions, or orientations between an emitter(s), detector(s), or measurement site(s)), and attenuation parameter values. For example, in some cases, the stored attenuation parameter data can include a ratio, a curve, a line, table, data points, or formula. For example, the stored data can include relationships similar to those shown in and described with respect to FIG. 9B.

At block 1010, the wearable device 10 calculates a value of physiological parameter based on the group of signals. The physiological parameter can vary across embodiments. For example, the physiological parameter can include any of the physiological parameters described herein such as, but not limited to, pulse rate, respiration rate, SpO$_2$, PVI, PI, RRp, SpHb, hydration, glucose, or blood pressure. In addition or alternatively, the wearable device 10 can use the value of the attenuated parameter to correct bias across subjects.

Fewer, more, or different blocks can be used as part of the routine 1000. For example, in some cases, the wearable device 10 generates an alarm or outputs an indication of the determination that first value does not satisfy the first attenuation parameter condition. For example, the wearable device 10 can cause a visual, audible, or tactile indication that indicates that the wearable device 10 readings may be at least temporarily inaccurate or unreliable due to first value failing to satisfy the first attenuation parameter condition.

The routine 1000 can be performed periodically or according to a schedule, policy, or algorithm. For example, a time-based schedule may be used so that the routine 1000 may be performed every X number of minutes, or every X hours(s), and so forth. In some cases, the routine 1000 can be performed responsive to an event. For example, the routine 1000 can be performed in response to a detection that the wearable device 10 is being (or was recently) attached to the wearer, the strap is being (or was recently) adjusted, or detection of a threshold motion by the wearer or a threshold movement of the wearable device 10.

Avoidance of Veins, Arteries, or Other Obstructing Tissue

As described herein, a wearable device 10 can be worn on a wearer's limb, such as the wearer's wrist. In measuring physiological parameters from the wrist, for example as compared to a finger, light may be flooded over a larger surface area having few capillaries and scattered light may not have a constant path length. Additionally, while a finger has many capillaries and no significant arteries or veins, a wrist has few capillaries and includes arteries and veins. Veins in particular can be problematic for optical measurements due to their relative proximity to the surface and much higher attenuation resulting in increased physiologic noise. There is a certain amount of positional randomness in light scattering from a vein or artery. Using system and methods described herein, the wearable device 10 can isolate one or more specific tissue paths that either do, or do not, contain significant venous pulsation signals prior to the collection of time variant data.

To solve these or other problems, systems and methods described herein may allow for identification and/or exclusion of detector signals that may be negatively impacted by veins, arteries, or other tissue structures (individually or collectively referred to as an "obstructing tissue"). For example, the wearable device 10 can include multiple detectors that are spatially separated from each other so that each detector detects attenuated light across a different tissue path. By utilizing multiple detectors that detect attenuated light across different tissue paths, the wearable device 10 can identify detector signals that correspond to an obstructed tissue path (e.g., a tissue path that traverses an obstructing tissue) and/or detector signals that correspond to an unobstructed tissue path (e.g., a tissue path that does not traverse an obstructing tissue). For example, the wearable device can run an independent analysis across different tissue paths and can compare results of different analyses. In some cases, if an analysis indicates a presence of an obstructing tissue, the wearable device 10 can discard, ignore, or give lower weight to the corresponding detector signal. Alternatively, if an analysis indicates an absence of an obstructing tissue, the wearable device 10 can accept or give higher weight to the corresponding detector signal.

In light of the description herein, it will be understood that the embodiments disclosed herein substantially improve wrist-based or other pulse oximetry and pulse oximetry in the presence of motion. Specifically, the embodiments disclosed herein enable a wearable device to determine whether a detector is positioned sufficiently proximate to an obstructing tissue (for example, an artery or vein) so as to cause inaccurate measurements from the detector. For example, in some cases, the wearable device can run analysis for different tissue paths (individual and/or sub-grouped detectors) to detector spatial discrepancies and isolate an affected detector or discard, ignore, or give little weight to its signals. The ability to identify when a detector may be affected by obstructing tissue advantageously increases the accuracy, usability, and reliability of the wrist-based or other pulse oximetry of the wearable device, thereby improving results of any wrist-based pulse oximetry performed by the device.

Figure 11:
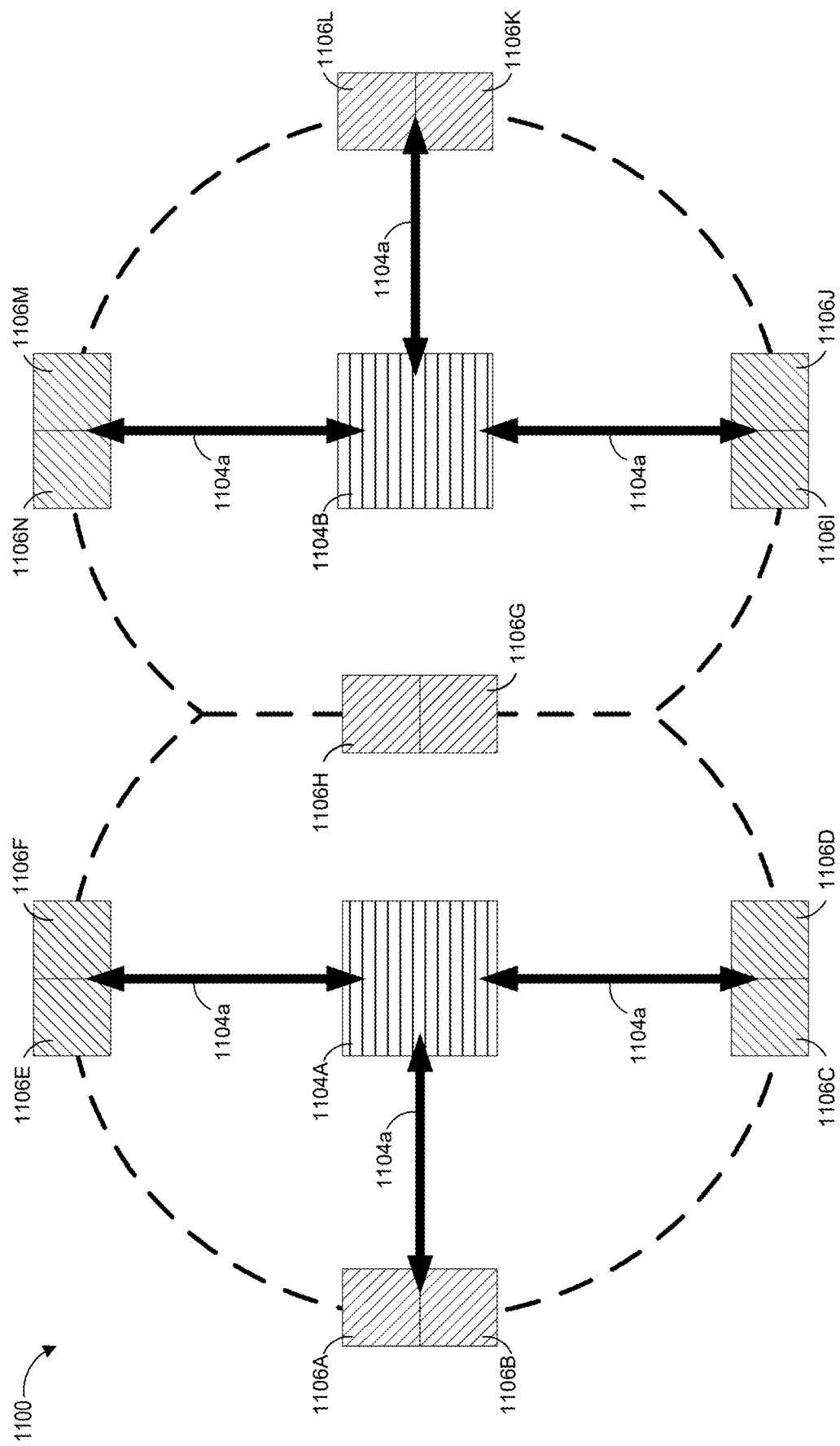
FIG. 11 illustrates an example spatial configuration of emitters and detectors of an example physiological monitoring device.

FIG. 11 illustrates an example spatial configuration of emitters 1104A, 1104B (individually or collectively referred to as emitter 1104 or emitters 1104) and a plurality of detectors 1106A-1106N (individually or collectively referred to as detector 1106 or detectors 1106) of a physiological monitoring device 1100. The physiological monitoring device 1100 can be an embodiment of, or include one or more features or components of, any of the wearable device 10, the plethysmograph module 100, the plethysmograph module 300, the hardware processors 702 and/or the wearable device 10. Furthermore, it will be appreciated that the layout shown in FIG. 11 represents an example spatial configuration and other examples may use fewer, additional, or different components or arrangements.

As shown, the device 1100 can include a plurality of emitters 1104 located a distance from each other. Although each emitter 1104 is illustrated as a single emitter, in some cases, each emitter 1104 includes multiple emitters, such as four, six or eight emitters. As described herein, the emitters 1104 can emit one or more wavelengths. Furthermore, the emitters can be activated concurrently or sequentially.

Each of the emitters 1104 can be at least partially surrounded by a group of detectors 1106. The illustrated example depicts two groups of eight detectors, with the first group including detectors 1106A-1106H and the second group including detectors 1106G-1106N. However, the number of detectors 1106 in a particular group can vary across embodiments. For example, a group can include, one, two, four, six, ten, or more detectors. As shown, in some cases, one or more detectors 1104 (in this example, detectors 1106G and 1106H) can be common to more than one group of detectors 1104. Furthermore, in some cases, the detectors 1106 are grouped into pairs (1106A and 1106B, 1106C and 1106D, etc.), where each pair is spatially separated from other pairs of detectors 1106. In some circumstances, each of the detectors 1106 is spatially separated from all other detectors 1106. As described herein, a processor can process signals from the detectors 1104. Accordingly, in this example, for each wavelength, the processor can receive data from a total of fourteen signal sources, two from each detector pair.

Flow Diagram

Figure 12:
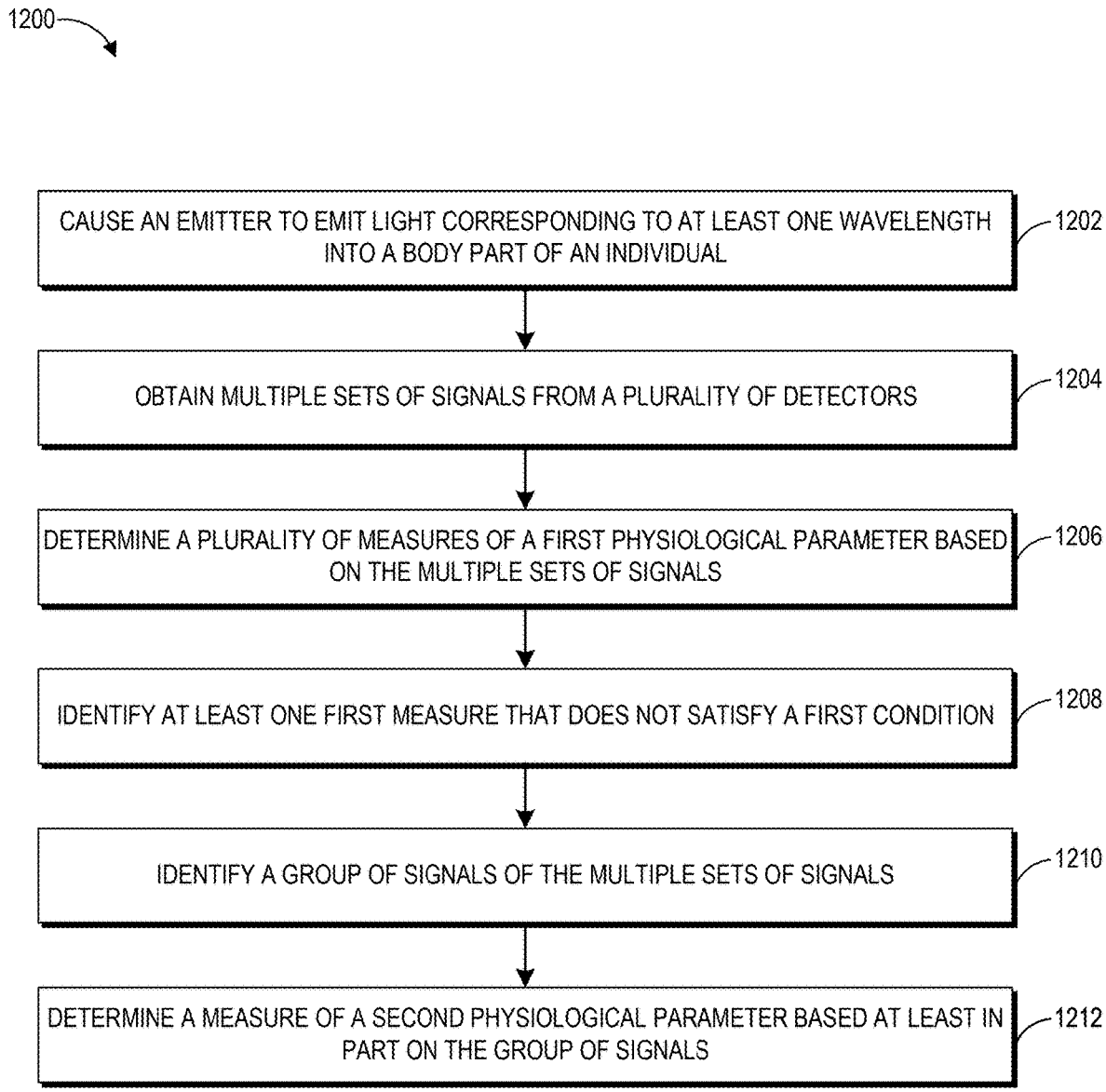
FIG. 12 is a flow diagram illustrative of an embodiment of a routine for determining a measure of a physiological parameter from a body part that include an obstructing tissue.

FIG. 12 is a flow diagram illustrative of an embodiment of a routine 1200, implemented by a wearable device 10, for determining a measure of a physiological parameter from a body part that include an obstructing tissue. Although described as being implemented by the wearable device 10, it will be understood that the elements outlined for routine 900 can be implemented by any computing device that is associated with the wearable device 10, such as, but not limited to, the device processor 14 or the plethysmography module 100. Thus, the following illustrative embodiment should not be construed as limiting.

At block 1202, the wearable device 10 causes at least one emitter of the wearable device 10 to emit light corresponding to one or more wavelengths. The particular wavelength(s) of the one or more wavelengths can vary across embodiments. For example, the one or more wavelengths can have a green color (for example, with a wavelength of 495-570 nm), a yellow color (for example, with a wavelength of 570-590 nm), an orange color (for example, with a wavelength of 590-620 nm), or a red color (for example, with a wavelength of 620-750 nm). As another example, the one or more wavelengths can include infrared light (for example, with a wavelength of 700 nm-1 mm).

In some implementations, the at least one emitter emits only one wavelength of light at a time. In this way, the wearable device 10 can perform an independent analysis for a particular wavelength. Alternatively, in some implementations, the at least one emitter emits multiple wavelengths of light concurrently. The at least one emitter can be implemented as a light emitting diode (LED) or any other suitable light emitting device.

In some cases, the one or more wavelengths includes a first wavelength and a second wavelength. For example, the first wavelength can include a wavelength within the range of about 520 nm to about 650 nm, such as about 525 nm or about 620 nm, while the second wavelength can include a wavelength within the range of about 600 nm to about 950 nm, such as about 620 nm or about 905 nm. In some cases, the second wavelength can correspond to a reference signal, such as by providing an orange or green color. In some cases, the wearable device 10 can use the second wavelength as a normalizing wavelength when calculating ratios of intensity signals of the other wavelengths.

The body part into which the one or more wavelengths of light are emitted can vary across embodiments. For example, the body part can include, but is not limited to, a finger, wrist, a forearm, an upper arm, a toe, an ankle, a calf, an upper leg, a neck, or the like. In some cases, the body part can depend on the location of the wearable device.

At block 1204, the wearable device 10 obtains multiple sets of signals from a plurality of spatially separated detectors of the wearable device 10. As described herein, each detector of the plurality of detectors detects light of the one or more wavelengths after the light interacts with the body part, and generates a respective set of signal based on the detected light. In some such cases, the wearable device 10 can obtain a set of signals corresponding to each detector. Consider a scenario in which the wearable device 10 includes three detector: a first detector, a second detector, and a third detector. In such a scenario, the wearable device 10 can obtain a first set of signals from the first detector, a second set of signals from the second detector, and a third set of signals from the third detector. It will be understood that the number of detectors can vary across embodiments.

Each set of signals of the multiple sets of signals are based on the light corresponding to the one or more wavelengths interacting with the body part. For example, a particular set of signals can correspond to an intensity of light detected by the respective detector. In some cases, the each set of signals corresponds to one or more photoplethysomography ("pleth") signals.

As described herein, the plurality of detectors are spatially separated from each other, thereby allowing the plurality of detectors to detect light (for example, by collecting diffuse reflectance remitted from the tissue surface) at various radial distances (or angles) from the at least one emitter and/or from the tissue site illuminated by the least one emitter. In some cases, some or all of the detectors can be different distances from the at least one emitter, the tissue site illuminated by the least one emitter, and/or each other. For example, at least two of the detectors can be linearly aligned with the emitter such that the at least two of the detectors are different distances from the emitter. In addition or alternatively, in some cases, at least two of the detectors have different radial angles relative to the emitter. For example, assuming the emitter to be the origin of a circle, a first detector of the detectors can be located at 0 degrees, while a second detector of the detectors 806 can be located at 90 degrees.

The path of the light from the emitter to a particular detector is generally referred to as the "light path." Because the detectors are spatially separated from each other, each of the detectors detects light that is associated with a different tissue path. In this way, a particular detector is associated with a particular tissue path. Similarly, the particular set of signals from the particular detector is associated with the particular tissue path. As described herein, in some cases, a tissue path may include an obstructing tissue, such as a vein or artery. In some such cases, the obstructing tissue within the light path causes erroneous measurements. Accordingly, it can be advantageous to identify those detector(s) and/or set(s) of signals that correspond to a light path that is affected by an obstructing tissue.

At block 1206, the wearable device 10 determines a plurality of measures of a first physiological parameter based at least in part on the plurality of sets of signals. For example, the wearable device 10 can determine a measure of the first physiological parameter for each set of signals. The first physiological parameter can include, but is not limited to, one or more of pulse rate, pulse strength, respiration rate, $SpO_2$, Pleth Variability Index (PVI), Perfusion Index (PI), Respiration from the pleth (RRp), total hemoglobin (SpHb), hydration, glucose, or blood pressure.

At block 1208, the wearable device 10 identifies at least one measure of the plurality of measures that does not satisfy a first condition. In some cases, the at least one measure includes only one measure. Alternatively, the at least one measure can include a plurality of measures. In some cases, the at least one measure comprises all of the measures of the plurality of measures that do not satisfy the condition. In some cases, each of plurality of measures satisfies the condition, and thus the wearable device 10 does not identify any measures at block 1206.

In some cases, a particular measure of the plurality of measures does not satisfy the first condition if the light path associated with that measure is affected by an obstructing tissue. For example, if the light path includes, or is affected by, a vein, an artery, or another obstructing tissue, then the particular measure may be affected such that it does not satisfy the first condition. In this way, by identifying the measures that do not satisfy the first condition, the wearable device 10 is able to identify the measures that may be erroneous, due to the obstructing tissue. Similarly, as described herein, by identifying the measures that do not satisfy the first condition, the wearable device 10 can identify the sets of signals that may be affected by the obstructing tissue, and can choose to disregard those sets of signals when determining future calculations.

In some cases, a particular measure of the plurality of measures does not satisfy the first condition if the light path associated with that measure is not affected by an obstructing tissue. For example, if the light path does not include, or is not affected by, a vein, an artery, or another obstructing tissue, then the particular measure may not satisfy the first condition. In this way, by identifying the measures that do not satisfy the first condition, the wearable device 10 is able to identify the measures that are associated with a high confidence, or are considered acceptable. Similarly, as described herein, by identifying the measures that do not satisfy the first condition, the wearable device 10 can identify the sets of signals that are likely not affected by the obstructing tissue, and can choose to use those sets of signals when determining future calculations.

The first condition can be associated with an acceptable or reliable value. For example, the wearable device 10 can determine that a value is acceptable or reliable if the measure satisfies the first condition. As a corollary, the wearable device 10 can determine that a measure is unacceptable or unreliable if the measure does not satisfy the first condition. In some such cases, the wearable device 10 can determine that the first measure does not satisfy the first condition based at least in part on a determination that the first measure does not exceed the first threshold, or is below the first threshold by a particular amount. Alternatively, the wearable device 10 can determine that the first measure does not satisfy the first condition based at least in part on a determination that the first measure exceeds the first threshold, or is above the first threshold by a particular amount.

In some cases, the first threshold is a predetermined value, such as a value that corresponds to an acceptable signal. In some cases, the first threshold can be calculated by the wearable device 10. For instance, the wearable device 10 can calculate a representation (for example, an average, a median, etc.) of the plurality of measures (or some subset thereof), and the wearable device 10 can calculate the first threshold as being some offset from the representation. For example, in some cases, the first threshold is a measure at least X percent or Y standard deviations above or below an average of the plurality of measures, where X is 5, 10, 15, or 20 and Y is 0.5, 1, 2, or 3.

At block 1210, the wearable device 10 identifies a group of signals of the multiple sets of signals based at least in part on the at least one measure. The wearable device 10 can identify sets of signals for inclusion in or exclusion from the group of signals based at least in part on the at least one measure. As mentioned herein, each set of signals of the multiple sets of signals corresponds to a particular measure of the plurality of measures, as well as a particular detector of the plurality of detectors.

The group of signals can include some or all of the sets of signals of the multiple sets of signals. In some cases, the group of signals includes some or all of the sets of signals that are likely affected by an obstructing tissue. By identifying some or all of the sets of signals that are likely affected by an obstructing tissue, the wearable device 10 can determine to discard, ignore, or assign a low weighting value to those sets of signals, which can advantageously improve the accuracy of future the measurements. As an example, in instances in which the at least one measure identified at block 1208 corresponds to an obstructing tissue, the wearable device 10 can identify the group of signals by identifying sets of signals that correspond to the at least one measure. As another example, in instances in which the at least one measure identified at block 1208 does not correspond to an obstructing tissue, the wearable device 10 can identify the group of signals by identifying sets of signals that does not correspond to the at least one measure.

In some cases, the group of signals includes some or all of the sets of signals that are likely unaffected by an obstructing tissue. By identifying some or all of the sets of signals that are likely unaffected by an obstructing tissue, the wearable device 10 can determine to use or assign a high weighting value to those sets of signals, which can advantageously improve the accuracy of future the measurements. As an example, in instances in which the at least one measure identified at block 1208 corresponds to an obstructing tissue, the wearable device 10 can identify the group of signals by identifying sets of signals that do not correspond to the at least one measure. As another example, in instances in which the at least one measure identified at block 1208 does not correspond to an obstructing tissue, the wearable device 10 can identify the group of signals by identifying sets of signals that correspond to the at least one measure.

At block 1212, the wearable device 10 determines a measure of a second physiological parameter based at least in part on the group of signals. The second physiological parameter can include, but is not limited to, one or more of pulse rate, pulse strength, respiration rate, $SpO_2$, Pleth Variability Index (PVI), Perfusion Index (PI), Respiration from the pleth (RRp), total hemoglobin (SpHb), hydration, glucose, or blood pressure.

Fewer, more, or different blocks can be used as part of the routine 1200. For example, in some cases, the wearable device 10 generates an alarm or outputs an indication of the determination that first measure does not satisfy the first condition. For example, the wearable device 10 can cause a visual, audible, or tactile indication that indicates that the wearable device 10 readings may be at least temporarily inaccurate or unreliable due to first value failing to satisfy the first attenuation parameter condition. As another example, in some cases, the wearable device 10 determines one or more detectors that may be associated with obstructing tissue. In this way, the wearable device 10 may be able to isolate or turn off those detectors that may provide erroneous data.

The routine 1200 can be performed periodically or according to a schedule, policy, or algorithm. For example, a time-based schedule may be used so that the routine 1200 may be performed every X number of minutes, or every X hours(s), and so forth. In some cases, the routine 1200 can be performed responsive to an event. For example, the routine 1200 can be performed in response to a detection that the wearable device 10 is being (or was recently) attached to the wearer, the strap is being (or was recently) adjusted, or detection of a threshold motion by the wearer or a threshold movement of the wearable device 10.

EXAMPLE EMBODIMENTS

Various example embodiments of methods, devices and non-transitory computer-readable medium relating to calibrating a non-invasive physiological sensor can be found in one or more of the following clauses:

Clause 1. A system for calibrating a non-invasive physiological sensor system, the system comprising:
a plurality of detectors configured to measure attenuated light from tissue of a patient, wherein detectors of the plurality of detectors are spatially separated so that each detector detects attenuated light from a different region of the tissue; and
one or more hardware processors configured to:
receive a first set of signals corresponding to a first detector of the plurality of spatially separated detectors;
receive a second set of signals corresponding to a second detector of the plurality of spatially separated detectors;
determine a value of an attenuation parameter based at least in part on the first set of signals and the second set of signal;
determine a physiological parameter based at least in part on the value of the attenuation parameter.

Clause 2. The system of claim 1, wherein the plurality of detectors are linearly aligned.

Clause 3. The system of claim 1, wherein the plurality of detectors are positioned so as to at least partially surround an emitter.

Clause 4. The system of claim 1, wherein the attenuation parameter comprises at least one of an effective attenuation coefficient, a reduced total interaction coefficient, an absorption coefficient, a reduced scattering coefficient, or a refractive index.

Clause 5. The system of claim 1, wherein the physiological parameter comprises at least one of SpO2 or Pulse Rate.

Clause 6. The system of claim 1, wherein the measurement site comprises at least one of a wrist or forearm.

Clause 7. The system of claim 1, wherein the non-invasive physiological sensor system is a wearable physiological monitoring device comprising an adjustable strap configured to releasably secure the wearable physiological monitoring device around a limb of the patient.

Clause 8. The system of claim 1, wherein to determine the value of the attenuation parameter, the one or more hardware processors are configured to determine the value of the attenuation parameter based at least in part on a first distance of the first detector from an emitter and a second distance of the second detector from the emitter.

Clause 9. The system of claim 1, wherein to determine the value of the attenuation parameter, the one or more hardware processors are configured to determine the value of the attenuation parameter based at least in part on a first distance of the first detector from an emitter and a second distance of the second detector from the emitter.

Clause 10. The system of claim 1, wherein to determine the value of the attenuation parameter, the one or more hardware processors are configured to:

determine a first normalized ratio value of light intensity corresponding to the first set of signals at first and second wavelengths;

determine a second normalized ratio value of light intensity corresponding to the second set of signals at the first and second wavelengths; and determine a natural logarithm associated with the first normalized ratio value and the second normalized ratio value.

Clause 11. The system of claim 10, wherein to determine the value of the attenuation parameter, the one or more hardware processors are configured to:

determine the value of the attenuation parameter based at least in part on results of the natural logarithm.

Clause 12. A method of controlling the system of any of claims 1-11.

Example Embodiments

Various example embodiments of methods, devices and non-transitory computer-readable medium relating to calibrating a non-invasive physiological sensor can be found in one or more of the following clauses:

Clause 1. A method for calibrating a non-invasive physiological sensor method, the method comprising:

causing an emitter of a wearable physiological monitoring device to emit light into a body part of a wearer of the device;

obtaining multiple sets of signals from a plurality of spatially separated detectors configured to measure attenuated light from the body part, wherein each detector of the plurality of spatially separated detectors detects attenuated light from a different region of the body part; and determining a plurality of measures of a first physiological parameter using the multiple sets of signals, wherein a particular measure of the plurality of values corresponds to a particular set of signals of the multiple sets of signals;

identifying at least one value of the plurality of values that does not satisfy a condition; and identifying a group of signals from the multiple sets of signals based at least in part on the identification of the at least one value.

Clause 2. The method of claim 1, further comprising determining a second physiological parameter based at least in part on the group of signals.

Clause 3. The method of claim 1, wherein said identifying the group of signals comprises identifying, for include in the group of signals, one or more sets of signals that correspond to the at least one value.

Clause 4. The method of claim 1, wherein said identifying the group of signals comprises identifying, for exclusion from the group of signals, one or more sets of signals that correspond to the at least one value.

Clause 5. The method of claim 1, wherein the group of signals does not include any sets of signals of the multiple sets of signals that corresponds to the at least one value.

Clause 6. The method of claim 1, wherein the group of signals includes each set of signals of the multiple sets of signals that corresponds to the at least one value.

Clause 7. The method of claim 1, wherein the group of signals includes each set of signals of the multiple sets of signals that corresponds to the at least one value.

Clause 8. The method of claim 1, wherein the group of signals does not include any set of signals of the multiple sets of signals that corresponds to the at least one value.

Clause 9. The method of claim 8, wherein the one or more hardware processors are configured to generate the attenuation parameter threshold based at least in part on the plurality of signals.

Clause 10. The method of claim 1, wherein the first physiological parameter comprises at least one of SpO2 or Pulse Rate.

Clause 11. The method of claim 1, wherein the body part comprises at least one of a wrist or forearm.

Clause 12. The method of claim 1, said identifying the at least one value comprises identifying one or more values of the plurality of values that correspond to obstructing tissue.

Clause 13. The method of claim 1, wherein the non-invasive physiological sensor method is a wearable physiological monitoring device comprising an adjustable strap configured to releasably secure the wearable physiological monitoring device around a limb of the patient.

Clause 14. The method of claim 1, wherein the spatially separated detectors are linearly aligned.

Clause 15. The method of claim 1, wherein the spatially separated detectors arranged to at least partially surround the emitter.

Clause 16. A wearable physiological monitoring device comprising a plurality of spatially separated detectors and one or more processors configured to perform the method of any of clauses 1-15.

Clause 17. A non-transitory computer-readable storage medium storing computer-executable instructions that when executed by one or more processors cause the one or more processors to perform the method of any of clauses 1-15.

Terminology

Many other variations than those described herein can be apparent from this disclosure. For example, depending on the embodiment, certain acts, events, or functions of any of the algorithms described herein can be performed in a different sequence, can be added, merged, or left out altogether (for example, not all described acts or events can be necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

Not necessarily all such advantages are achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality can be implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a hardware processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "for example," and the like, unless specifically stated otherwise, or otherwise understood within the context as used, are generally intended to convey that certain embodiments include, while other embodiments do not include, certain features, elements and/or states. Thus, such conditional language is not generally intended to imply that features, elements and/or states are in any way may be required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" mechanism one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, can be otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments may require at least one of X, at least one of Y, or at least one of Z to each be present.

Unless otherwise explicitly stated, articles such as "a" or "an" should generally be interpreted to include one or more described items. Accordingly, phrases such as "a device configured to" is intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it is understood that various omissions, substitutions, and changes in the form and details of the devices or algorithms illustrated can be made without departing from the spirit of the disclosure. As is recognized, certain embodiments of the inventions described herein can be embodied within a form that does not provide all of the features and benefits set forth herein, as some features can be used or practiced separately from others.

What is claimed is:

1. A method of determining one or more physiological parameters using a non-invasive physiological sensor, the one or more physiological parameters including pulse rate, respiration rate, $SpO_2$, PVI, PI, RRp, SpHb, hydration, glucose, or blood pressure, the method comprising using one or more hardware processors to:
  cause an emitter of a wearable physiological monitoring device to emit light into a body part of a wearer of the device;
  obtain multiple sets of signals from a plurality of spatially separated detectors of the wearable physiological monitoring device configured to measure attenuated light from the body part, wherein each detector of the plurality of spatially separated detectors detects attenuated light from a different region of the body part;
determine a plurality of values indicative of a first physiological parameter using the multiple sets of signals;
identify at least one value of the plurality of values that does not satisfy a condition, the condition being an evaluation of an attenuation parameter;
identify a group of signals from the multiple sets of signals based at least in part on the identification of the at least one value; and
determine a final value of the first physiological parameter based at least in part on the group of signals.

2. The method of claim 1, wherein said identifying the group of signals comprises identifying, for include in the group of signals, one or more sets of signals that correspond to the at least one value.

3. The method of claim 1, wherein said identifying the group of signals comprises identifying, for exclusion from the group of signals, one or more sets of signals that correspond to the at least one value.

4. The method of claim 1, wherein the group of signals does not include any sets of signals of the multiple sets of signals that corresponds to the at least one value.

5. The method of claim 1, wherein the group of signals includes each set of signals of the multiple sets of signals that corresponds to the at least one value.

6. The method of claim 1, wherein the group of signals does not include any set of signals of the multiple sets of signals that corresponds to the at least one value.

7. The method of claim 6, wherein the one or more hardware processors are configured to generate an attenuation parameter threshold based at least in part on the plurality of signals.

8. The method of claim 1, wherein the first physiological parameter comprises at least one of SpO2 or Pulse Rate.

9. The method of claim 1, wherein the body part comprises at least one of a wrist or forearm.

10. The method of claim 1, said identifying the at least one value comprises identifying one or more values of the plurality of values that correspond to obstructing tissue.

11. The method of claim 1, wherein the wearable physiological monitoring device comprising an adjustable strap configured to releasably secure the wearable physiological monitoring device around a limb of a patient.

12. A physiological monitoring device comprising:
one or more processors configured to:
cause an emitter of a wearable physiological monitoring device to emit light into a body part of a wearer of the device;
obtain multiple sets of signals from a plurality of spatially separated detectors of the wearable physiological monitoring device, each detector configured to measure attenuated light from the body part, wherein each detector of the plurality of spatially separated detectors detects attenuated light from a different region of the body part;
determine a plurality of values indicative of a first physiological parameter using the multiple sets of signals;
identify at least one value of the plurality of values that does not satisfy a condition, the condition being an evaluation of an attenuation parameter;
identify a group of signals from the multiple sets of signals based at least in part on the identification of the at least one value; and
determining a final value of the first physiological parameter based at least in part on the group of signals.

13. The device of claim 12, wherein to identify the group of signals, the one or more processors are configured to identify, for include in the group of signals, one or more sets of signals that correspond to the at least one value.

14. The device of claim 12, wherein to identify the group of signals, the one or more processors are configured to identify, for exclusion from the group of signals, one or more sets of signals that correspond to the at least one value.

15. A non-transitory computer-readable storage medium storing computer-executable instructions that when executed by one or more processors cause the one or more processors to perform a method comprising:
causing an emitter of a wearable physiological monitoring device to emit light into a body part of a wearer of the device;
obtaining multiple sets of signals from a plurality of spatially separated detectors configured to measure attenuated light from the body part, wherein each detector of the plurality of spatially separated detectors detects attenuated light from a different region of the body part;
determining a plurality of values indicative of a first physiological parameter using the multiple sets of signals;
identifying at least one value of the plurality of values that does not satisfy a condition, the condition being an evaluation of an attenuation parameter;
identifying a group of signals from the multiple sets of signals based at least in part on the identification of the at least one value; and
determining a final value of the first physiological parameter based at least in part on the group of signals.

16. The non-transitory computer-readable storage medium of claim 15, wherein said identifying the group of signals comprises identifying, for include in the group of signals, one or more sets of signals that correspond to the at least one value.

* * * * *